US008136958B2

(12) United States Patent
Verfuerth et al.

(10) Patent No.: US 8,136,958 B2
(45) Date of Patent: *Mar. 20, 2012

(54) MODULAR LIGHT FIXTURE WITH POWER PACK

(75) Inventors: Neal R. Verfuerth, Plymouth, WI (US); Ronald E. Ernst, Waldo, WI (US); Kenneth J. Wetenkamp, Plymouth, WI (US)

(73) Assignee: Orion Energy Systems, Inc., Manitowoc, WI (US)

( * ) Notice: Subject to any disclaimer, the term of this patent is extended or adjusted under 35 U.S.C. 154(b) by 313 days.

This patent is subject to a terminal disclaimer.

(21) Appl. No.: 12/345,443

(22) Filed: Dec. 29, 2008

(65) Prior Publication Data

US 2009/0147507 A1 Jun. 11, 2009

Related U.S. Application Data

(63) Continuation-in-part of application No. 11/242,620, filed on Oct. 3, 2005, now Pat. No. 7,575,338.

(51) Int. Cl.
*F21S 4/00* (2006.01)
(52) U.S. Cl. ......... 362/221; 362/148; 362/220; 362/260
(58) Field of Classification Search .................. 362/221, 362/225, 217.08, 217.09, 657
See application file for complete search history.

(56) References Cited

U.S. PATENT DOCUMENTS

| 1,918,126 | A | 7/1933 | Peterson |
|---|---|---|---|
| D119,800 | S | 4/1940 | Carter, Jr. |
| D122,887 | S | 10/1940 | Beals |
| 2,306,206 | A | 12/1942 | Dalgleish |
| 2,312,617 | A | 3/1943 | Beck |
| D142,126 | S | 8/1945 | Sabatini |
| 2,403,240 | A | 7/1946 | Sawin |
| D147,812 | S | 11/1947 | Picker |
| D150,735 | S | 8/1948 | Schwartz et al. |
| 2,619,583 | A | 11/1952 | Baumgartner |
| 2,636,977 | A | 4/1953 | Foster |
| 2,748,359 | A | 5/1956 | Swan |
| 3,247,368 | A | 4/1966 | McHugh |
| 3,337,035 | A | 8/1967 | Pennybacker |
| 3,390,371 | A | 6/1968 | Kramer |
| D217,615 | S | 5/1970 | Kress |

(Continued)

OTHER PUBLICATIONS

Hubble Lighting Hazardous Locations Fluourescent Brochure, published 1994.

(Continued)

*Primary Examiner* — Stephen F Husar
*Assistant Examiner* — James Cranson, Jr.
(74) *Attorney, Agent, or Firm* — Foley & Lardner LLP

(57) ABSTRACT

A modular light fixture includes a fixture body having a frame with a top a bottom. The top defines a ballast channel and the bottom has a reflector formed from a sheet material. A lampholder is mounted to the frame and receives and electrically connects to a fluorescent tube positioned adjacent to the reflector. A detachable power pack is removable from the top of the frame and includes a ballast channel cover that detachably engages the ballast channel on the top of frame, and a ballast mounted to the ballast channel cover and having power input wiring, and ballast output wiring electrically connected to the lampholder. A power input connector has a socket portion mounted to the ballast channel cover and electrically connected to the power input wiring of the ballast, and a plug portion connected to a power supply line to provide electrical power from a power source.

26 Claims, 20 Drawing Sheets

U.S. PATENT DOCUMENTS

| | | | |
|---|---|---|---|
| 3,571,781 | A | 3/1971 | Gartland, Jr. |
| 3,860,829 | A | 1/1975 | Fabbri |
| 4,001,571 | A | 1/1977 | Martin |
| 4,144,462 | A | 3/1979 | Sieron et al. |
| 4,146,287 | A | 3/1979 | Jonsson |
| 4,169,648 | A | 10/1979 | Moist, Jr. |
| D263,699 | S | 4/1982 | Vest et al. |
| 4,387,417 | A | 6/1983 | Plemmons et al. |
| 4,435,744 | A | 3/1984 | Russo |
| 4,443,048 | A | 4/1984 | Moist, Jr. |
| 4,544,220 | A | 10/1985 | Aiello et al. |
| 4,674,015 | A | 6/1987 | Smith |
| 4,690,476 | A | 9/1987 | Morgenrath |
| 4,701,698 | A | 10/1987 | Karlsson et al. |
| 4,708,662 | A | 11/1987 | Klein |
| 4,726,780 | A | 2/1988 | Thackeray |
| 4,749,941 | A | 6/1988 | Halder et al. |
| 4,814,954 | A | 3/1989 | Spitz |
| 4,834,673 | A | 5/1989 | Beinhaur et al. |
| 4,904,195 | A | 2/1990 | Thackeray |
| 4,907,985 | A | 3/1990 | Johnsen |
| 4,928,209 | A | 5/1990 | Rodin |
| 4,933,633 | A | 6/1990 | Allgood |
| D311,900 | S | 11/1990 | Esslinger |
| 5,013,253 | A | 5/1991 | Aiello et al. |
| 5,037,325 | A | 8/1991 | Wirkus |
| 5,062,030 | A | 10/1991 | Figueroa |
| 5,069,634 | A | 12/1991 | Chiarolanzio |
| 5,111,370 | A | 5/1992 | Clark |
| D329,919 | S | 9/1992 | Jahn |
| 5,192,129 | A | 3/1993 | Figueroa |
| 5,274,533 | A | 12/1993 | Neary et al. |
| 5,315,236 | A | 5/1994 | Lee |
| 5,320,560 | A | 6/1994 | Fladung |
| 5,342,221 | A | 8/1994 | Peterson |
| 5,349,289 | A | 9/1994 | Shirai |
| 5,357,170 | A | 10/1994 | Luchaco et al. |
| 5,371,661 | A | 12/1994 | Simpson |
| 5,377,075 | A | 12/1994 | Schmid et al. |
| 5,395,264 | A | 3/1995 | Keith |
| 5,462,452 | A | 10/1995 | Devine |
| D364,478 | S | 11/1995 | Pesau |
| D365,409 | S | 12/1995 | Lu |
| 5,473,522 | A | 12/1995 | Kriz et al. |
| 5,489,827 | A | 2/1996 | Xia |
| 5,616,042 | A | 4/1997 | Raby, Sr. et al. |
| D381,629 | S | 7/1997 | Goto |
| 5,673,022 | A | 9/1997 | Patel |
| 5,676,563 | A | 10/1997 | Kondo et al. |
| 5,727,871 | A | 3/1998 | Kotloff |
| 5,743,627 | A | 4/1998 | Casteel |
| D395,727 | S | 6/1998 | Thorton, Jr. |
| D399,019 | S | 9/1998 | Wilmotte |
| D402,763 | S | 12/1998 | Bring |
| 5,855,494 | A | 1/1999 | Blaszczyk et al. |
| 5,907,197 | A | 5/1999 | Faulk |
| 5,961,207 | A | 10/1999 | Petkovic |
| D416,542 | S | 11/1999 | Tsai |
| 6,024,594 | A | 2/2000 | Self, Jr. et al. |
| D425,860 | S | 5/2000 | Goto |
| 6,059,424 | A | 5/2000 | Kotloff |
| 6,091,200 | A | 7/2000 | Lenz |
| 6,102,550 | A | 8/2000 | Edwards, Jr. |
| D434,167 | S | 11/2000 | Foster |
| 6,151,529 | A | 11/2000 | Batko |
| 6,210,019 | B1 | 4/2001 | Weathers |
| D447,266 | S | 8/2001 | Verfuerth |
| D447,736 | S | 9/2001 | Nakashima et al. |
| 6,291,770 | B1 | 9/2001 | Casperson |
| 6,328,597 | B1 | 12/2001 | Epps |
| D460,735 | S | 7/2002 | Verfuerth |
| 6,420,839 | B1 | 7/2002 | Chiang et al. |
| D463,059 | S | 9/2002 | Verfuerth |
| D466,867 | S | 12/2002 | Krobusek |
| 6,496,756 | B1 | 12/2002 | Nishizawa et al. |
| 6,540,549 | B2 | 4/2003 | Rupert |
| 6,585,396 | B1 | 7/2003 | Verfuerth |
| D479,826 | S | 9/2003 | Verfuerth et al. |
| 6,644,836 | B1 | 11/2003 | Adams |
| D483,332 | S | 12/2003 | Verfuerth |
| 6,710,588 | B1 | 3/2004 | Verfuerth et al. |
| 6,724,180 | B1 | 4/2004 | Verfuerth et al. |
| 6,746,274 | B1 | 6/2004 | Verfuerth |
| 6,758,580 | B1 | 7/2004 | Verfuerth |
| 6,774,619 | B1 | 8/2004 | Verfuerth et al. |
| 6,979,097 | B2 | 12/2005 | Elam et al. |
| 7,282,840 | B2 | 10/2007 | Chih |
| 7,575,338 | B1 * | 8/2009 | Verfuerth ..................... 362/221 |
| 2002/0172049 | A1 | 11/2002 | Yueh |
| 2002/0189841 | A1 | 12/2002 | Patterson |
| 2003/0179577 | A1 | 9/2003 | Marsh |
| 2004/0076001 | A1 | 4/2004 | Lutes |
| 2005/0201088 | A1 | 9/2005 | Stach et al. |
| 2006/0232959 | A1 | 10/2006 | Hutchison et al. |
| 2008/0007943 | A1 | 1/2008 | Verfuerth et al. |
| 2008/0007944 | A1 | 1/2008 | Verfuerth et al. |
| 2009/0034263 | A1 | 2/2009 | Stenback et al. |

OTHER PUBLICATIONS

Photos of Hubble Lighting Hazardous Locations Fluourescent Fixture.

Day-Brite 4' or 8' Assembly Line Light Luminaire Brochure, published 2000.

Day-Brite Assembly Line Light Fixture Webpage.

Los Angeles Lighting Mfg. Co. Open Commercial, Ladder Arm Strip Brochure, published no later than 2000.

Los Angeles Lighting Mfg. Co. Open Commercial, Ladder Arm Strip Webpage, published 1998.

Electrical Eng. Handbook: 14$^{th}$ Edition; McGraw Hill Pub. ISBN #0070220050; Editor Fink, et al., pp. 26-57.

* cited by examiner

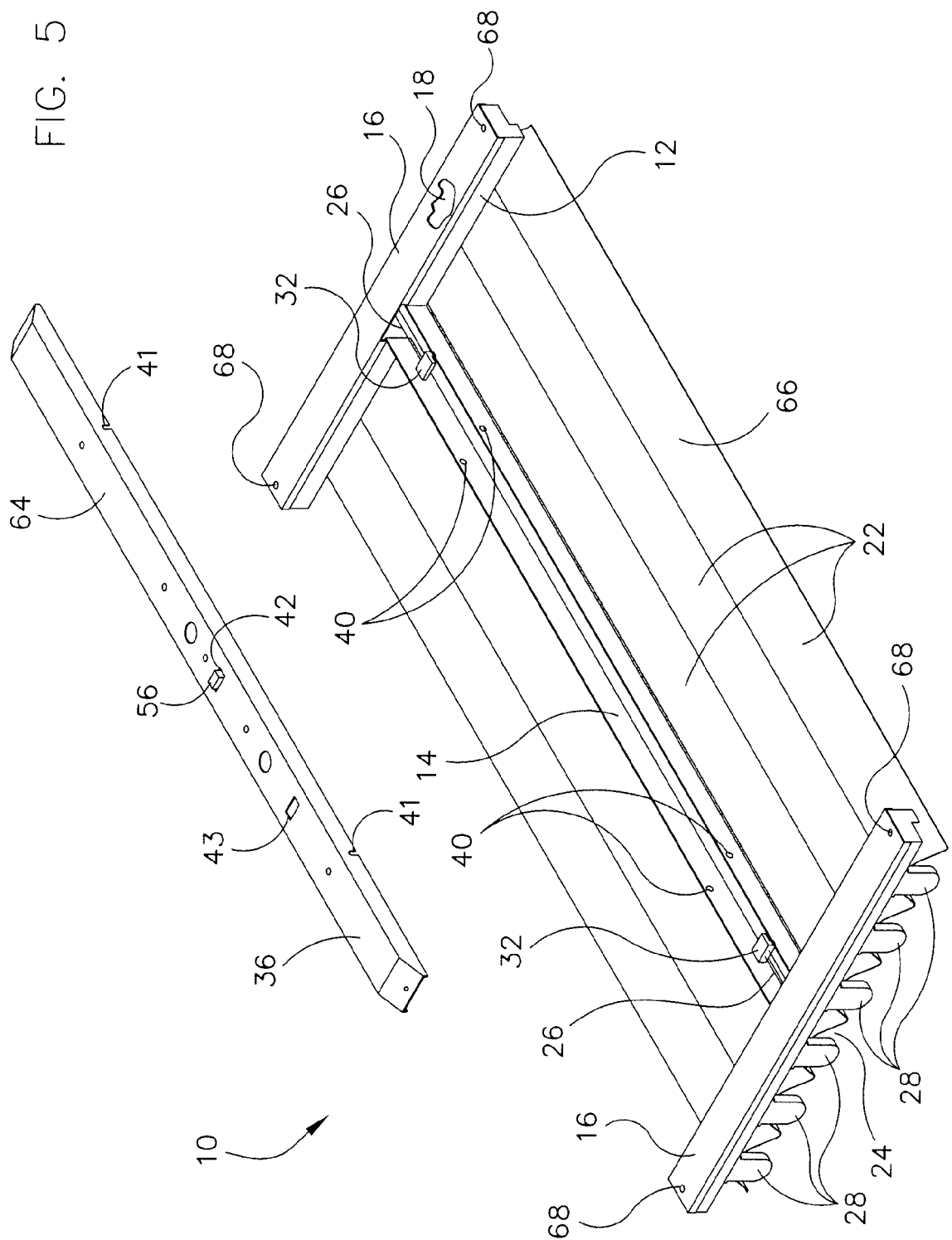

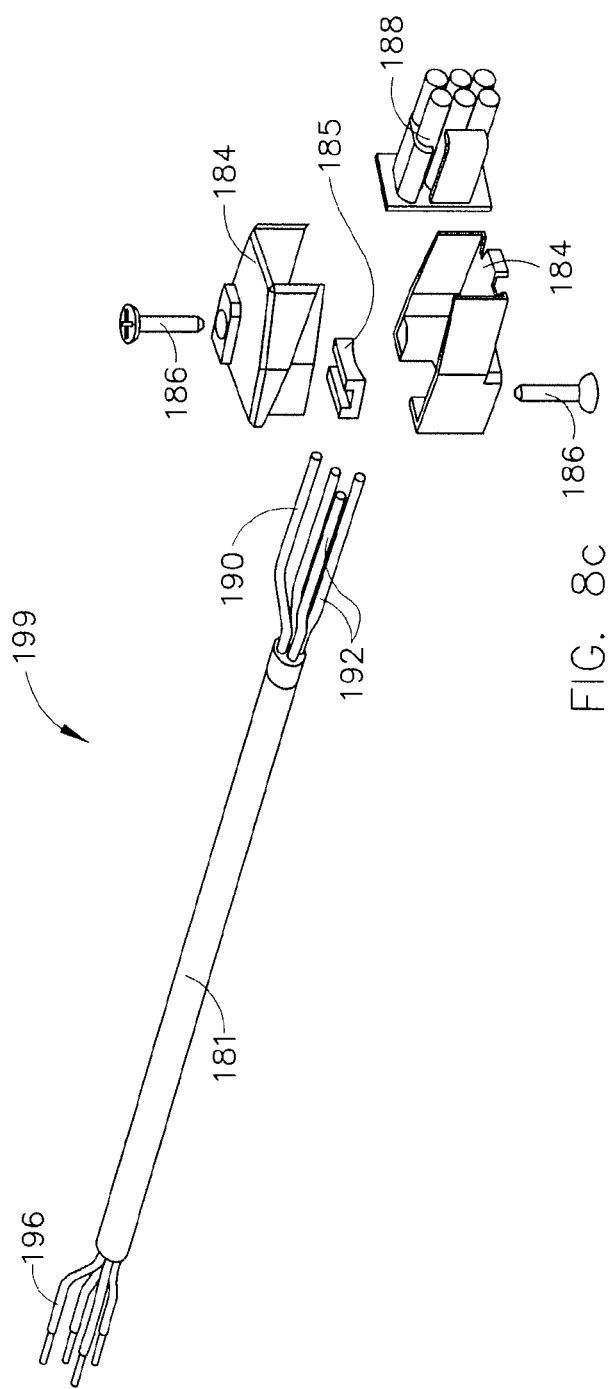
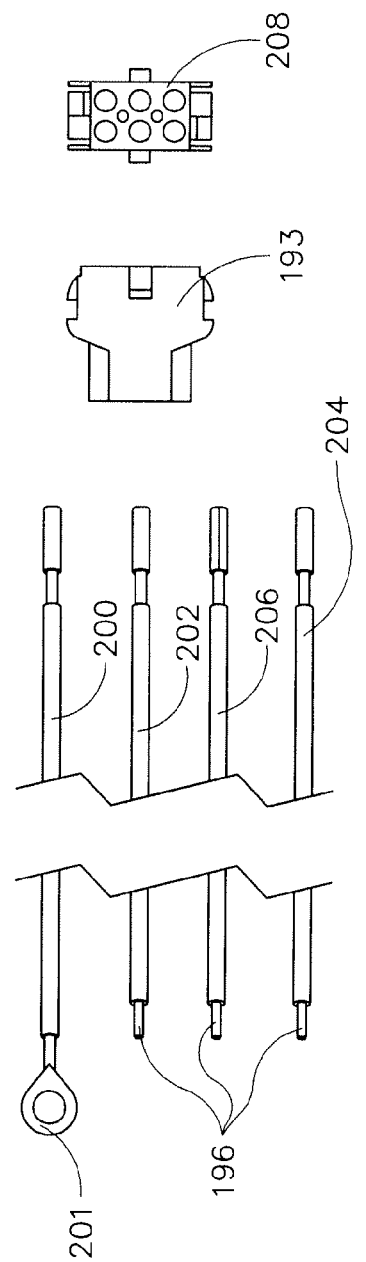
FIG. 8c
FIG. 9

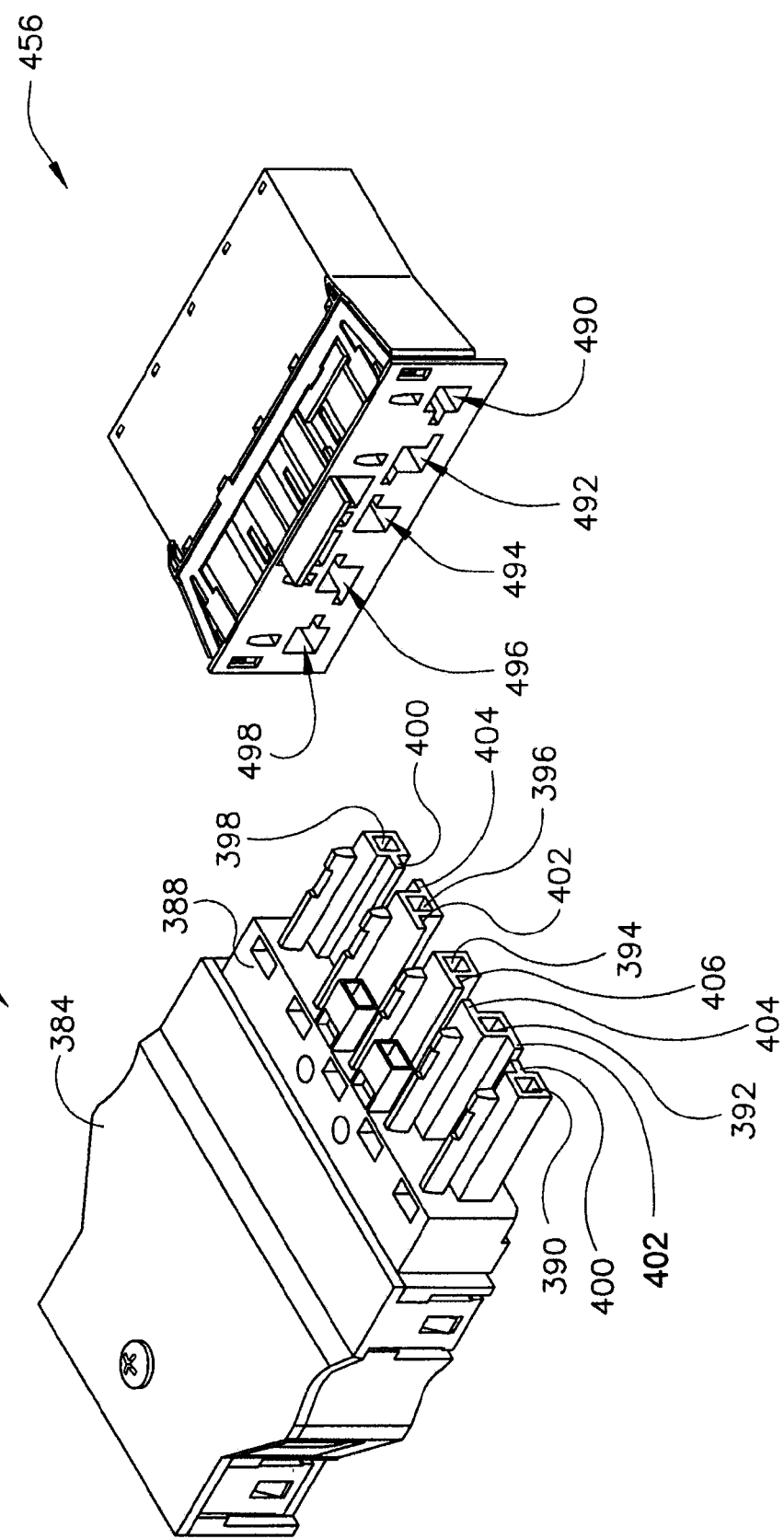

MODULAR LIGHT FIXTURE WITH POWER PACK

CROSS REFERENCE TO RELATED APPLICATIONS

The present Application claims the benefit of priority as a continuation-in-part of co-pending U.S. patent application Ser. No. 11/242,620, titled "Modular Light Fixture With Power Pack" filed on Oct. 3, 2005, the disclosure of which is hereby incorporated by reference in its entirety.

FIELD

The present invention relates generally to energy management and utilization in large commercial buildings, and more particularly to a modular light fixture apparatus and method therefor.

BACKGROUND

In large commercial buildings, recurring electricity costs for lighting can be more than half of the total energy budget. Consequently, there are considerable economic benefits to be obtained through more efficient lighting techniques. For example, simple devices such as motion sensor switches or light timers are often used to reduce wasted energy by reducing unnecessary lighting.

Long term energy and lighting management in large commercial lighting applications presents greater challenges. Lighting requirements in different areas of a store or manufacturing plant may change as departments move or reorganize. Lighting technologies change over time, delivering improved performance and efficiency. Thus, it may become necessary or desirable to replace obsolete lighting technology with newer technology, or to relocate, enhance, or maintain existing lighting fixtures. Especially as energy costs continue to rise, many existing commercial buildings will eventually consider some form of lighting retrofit or redeployment.

Existing commercial buildings vary widely in age, construction, and intended use, so the available electric power sources may have any of several different voltage levels, and access to that power may be provided using a variety of electrical connection types. Support and mounting techniques will vary. Further, lighting requirements, such as light level, spectrum, and timing, are as diverse as the range of intended uses.

Many large commercial lighting applications depend heavily on fluorescent light fixtures driven by a ballast. The type of ballast determines, for example, the power consumption and optimal type of lamp to be used in the fixture. Along with characteristics of the light fixture itself, such as the geometry of the fixture, heat management, and the shapes of the reflectors, the choice of ballast and lamp largely determine the gross light production, expected maintenance interval, and energy consumption of the fixture. Consequently, effective lighting redeployment may require changing the ballast and/or type of lamp used in the fixture.

Light fixtures having enhanced features are familiar to consumers. For example, light fixtures can include photodetectors or motion detectors. A light fixture can be continuously dimmable, or it may include two or more separately controllable light circuits for lighting that can be completely off, partially on, or fully on. A lighting redeployment may introduce or change the use of such enhanced features to help conserve electrical power.

In a typical prior art light fixture, the ballast and any enhanced features are usually hard wired inside the fixture, and the fixture is hard-wired to building power. So, except for changing the lamp, changes to a typical prior art light fixture may often require services of a relatively highly skilled worker, such as an electrician, and/or replacement of the entire fixture.

Thus, it can be costly to remove and replace existing light fixtures, or even to reposition existing light fixtures. It can also be costly to modify or enhance existing light fixtures with different ballast technology or enhanced features to improve their effectiveness or efficiency. Because of these economic barriers, existing light fixtures tend to remain in place even when they are obsolete or lighting requirements change, resulting in wasted electrical power and lost productivity due to ineffective lighting.

Thus, what is needed is a modular light fixture architecture specially adapted for flexible, cost-effective, and safe retrofit to existing commercial buildings. What is further needed is a modular light fixture architecture specially adapted for flexible, cost-effective, and safe long term maintenance and redeployment in response to changing lighting requirements and improvements in technology.

SUMMARY

A first aspect of the invention relates to a modular light fixture that includes a fixture body having a frame with a top a bottom. The top defines a ballast channel and the bottom has a reflector formed from a sheet material. A lampholder is mounted to the frame and receives and electrically connects to a fluorescent tube positioned adjacent to the reflector. A detachable power pack is removable from the top of the frame and includes a ballast channel cover that detachably engages the ballast channel on the top of frame, and a ballast mounted to the ballast channel cover and having power input wiring, and ballast output wiring electrically connected to the lampholder. A power input connector has a socket portion mounted to the ballast channel cover and electrically connected to the power input wiring of the ballast, and a plug portion connected to a power supply line to provide electrical power from a power source.

Another aspect of the invention relates to method of installing lighting in a building and includes the following steps. Providing a light fixture having a fixture body with a frame having a top side and a bottom side, the top side defining with a ballast channel, and a lampholder mounted to the frame, where the lampholder includes a lampholder harness connector, and a power pack that includes a ballast channel cover detachably mounted to the top side of the frame and over the ballast channel, and a ballast mounted to the ballast channel cover with power input wiring, and a power input connector having a socket portion mounted within an aperture on the ballast channel cover and electrically connected to the power input wiring of the ballast. Another step includes connecting the a plug portion of the power input connector to a flexible power supply line electrically connected to the power source. Another step included coupling the socket portion to the plug portion on the top side of the frame so that the ballast receives power from the power source without removal of the ballast channel cover.

Another aspect of the invention relates to a light fixture kit having a frame with a top side and a bottom side, and a first raceway and a second raceway on opposite ends of the frame, and a first lampholder mounted to the first raceway and a second lampholder mounted to the second raceway, where the lampholders are electrically connected to a lampholder harness connector. A detachable power pack includes a ballast channel cover that detachably engages the top side of the frame, and a ballast mounted to the ballast channel cover, wherein the ballast comprises power input wiring and ballast output wiring, and a socket portion of a power input connector mounted to the ballast channel cover and electrically connected to the power input wiring of the ballast, and a plug portion of the connector electrically connectable to a power source for providing a live load disconnect capable of supplying power to, and removing power from, the ballast without removal of the ballast channel cover.

BRIEF DESCRIPTION OF THE DRAWINGS

FIG. 5 is a perspective view from the side of the light fixture of FIG. 1, with the detachable power pack separated from the body of the light fixture;

FIGS. 8(a)-8(c) are perspective views of exemplary modular power supply cords for use according to the invention;

FIG. 9 presents plan views of the components of exemplary power input wiring for use according to the invention;

FIG. 13(a) is a detailed perspective view of the connector for a modular power supply cord according to the embodiment shown in FIGS. 12(a) and 12(b).

FIG. 13(b) is a detailed perspective view of a power input connector for use with the connector for a modular power supply cord according to the embodiment shown in FIGS. 12(a)-12(b), and FIG. 13(a).

DETAILED DESCRIPTION

FIGS. 1-5 show various views of an exemplary fluorescent tube light fixture 10 for use in a method and apparatus according to the invention. As perhaps best shown in FIGS. 4-5, the fixture 10 consists generally of a fixture body 66 and a detachable power pack 64.

Figure 2:
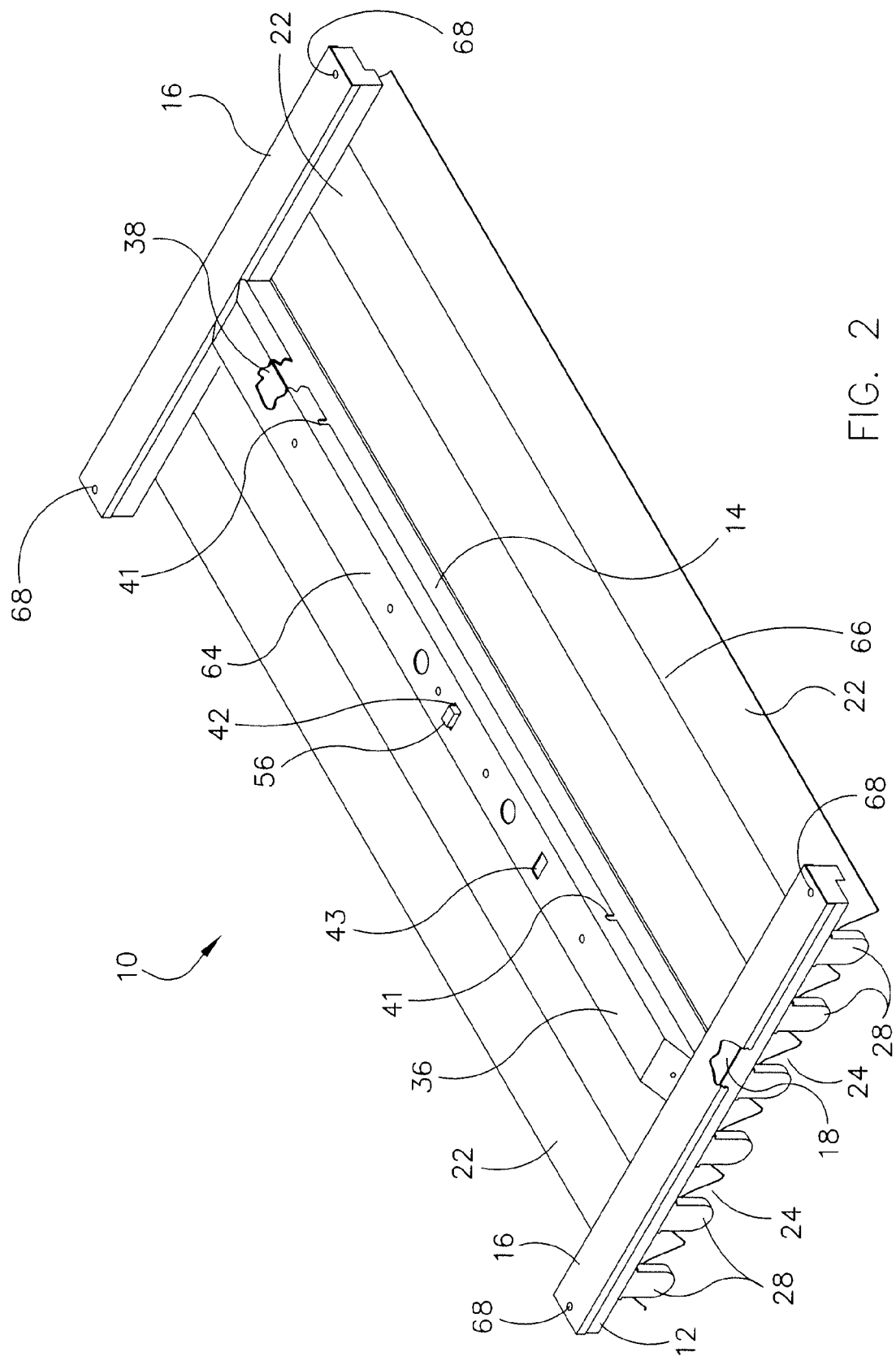
FIG. 2 is an assembled perspective view of the light fixture of FIG. 1.
Figure 3:
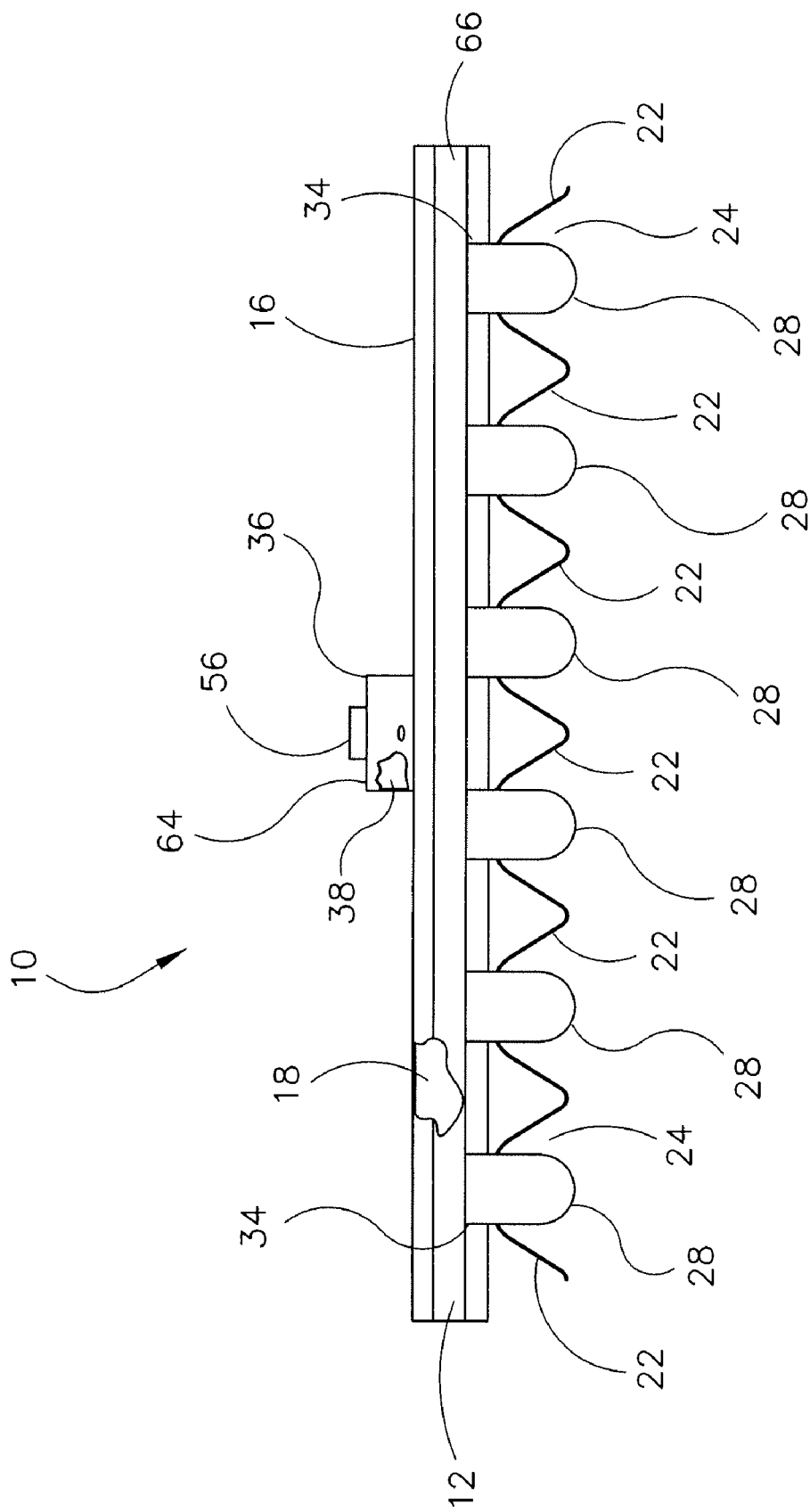
FIG. 3 is an end view of the light fixture of FIG. 1.

The fixture body 66 preferably includes a pair of raceways 12 connected by a ballast channel 14 to form a generally I-frame configuration. Each raceway 12 is preferably enclosed with a raceway cover 16, so that the raceway 12 and raceway cover 16 together form a raceway channel 18, as shown in FIGS. 2-3.

Each end of each raceway 12 preferably includes a suspension point 68, for suspending the light fixture 10 above an area to be illuminated, for example using one or more chains connected between the suspension points 68 and the ceiling. The suspension points 68 are preferably located at or near the corners of the fixture, to ensure that the suspension hardware does not interfere with maintenance of the light fixture including but not limited to replacement of the detachable power pack 64.

One or more light reflectors 22 are secured to each of the raceways 12 such as by rivets, bolts, screws or the like. Six reflectors are shown in the drawings, however, it should be noted that any number of light reflectors can be used with the present invention. Each light reflector 22 can be fabricated from a single piece of material or can be fabricated of individual pieces of material. Any exposed edges of the light reflectors 22 are preferably folded back (hemmed) to reduce sharp edges and improve safety. In the exemplary embodiment of FIG. 1, each light reflector 22 defines a reflector channel 24 adapted to house a lamp 30 (not shown in FIGS. 1-5), which is preferably a fluorescent tube lamp. However, a light fixture according to the invention could be used with other types of discharge lamps, such as a metal halide or sodium lamp.

The fixture body 66 includes lampholder harnesses 26 housed in the two raceway channels 18 at the opposite ends of the light fixture. Each lampholder harness 26 includes one or more lampholders (sockets) 28 and a lampholder harness connector 32. Each lampholder 28 preferably extends through a corresponding aperture 34 in a raceway 12 adjacent to the end of a reflector channel 24. In normal operation, a single fluorescent tube lamp extends between a pair of lampholders 28 at opposite ends of each reflector channel 24.

Figure 4:
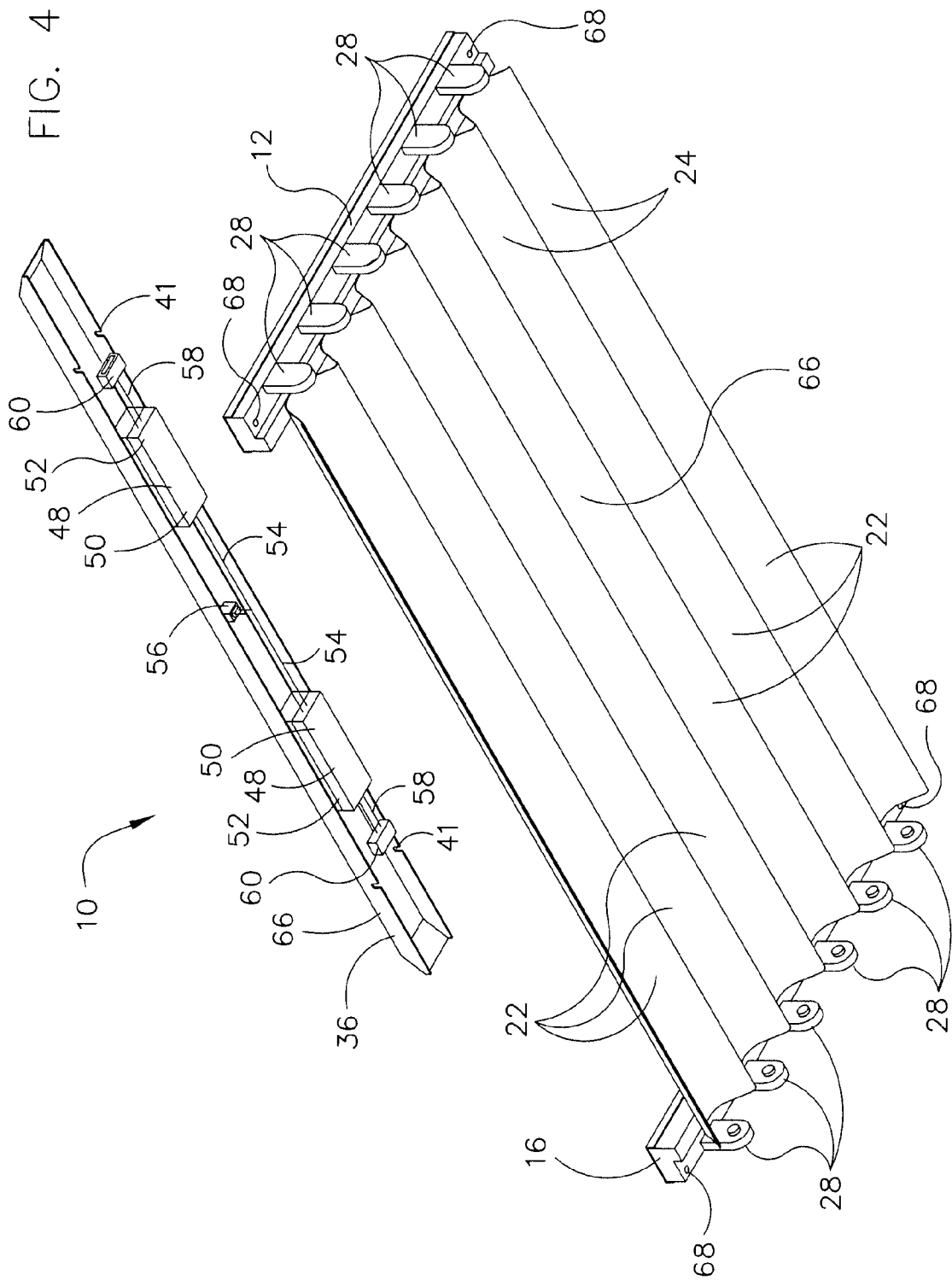
FIG. 4 is a perspective view from below the light fixture of FIG. 1, with the detachable power pack separated from the body of the light fixture.

As perhaps best shown in FIG. 4, the detachable power pack 64 of the light fixture 10 preferably includes a ballast channel cover 36, one or more ballasts 48, power input wiring 54, a modular power input connector 56, ballast output wiring 58, and a modular ballast output connector 60. The detachable power pack 64 is preferably detachable from the light fixture body 66 without the use of tools, and without any interference from the suspension hardware.

As perhaps best shown in FIGS. 2 and 5, the ballast channel cover 36 of the detachable power pack 64 engages the ballast channel 14 of the fixture body 66 to define a ballast chamber 38. The ballast channel cover 36 preferably includes cover clip portions 41 which mate with corresponding body clip portions 40 to detachably attach the ballast channel cover 36 to the ballast channel 14. The clips provide an interference or frictional fit that preferably can be separated without the use of tools. However, this is not required, and other means, such as screws, could be used to detachably attach the detachable power pack 64 to the fixture body 66.

The ballast channel cover preferably includes a power line connector aperture 42 adapted to receive a modular power input connector 56, and a feature connector aperture 43 adapted to receive a feature connector (not shown). The modular power input connector 56 is preferably a polarized modular power input socket 210 configured for the available electrical power supply voltage and configuration, as discussed in more detail below in reference to FIGS. 9-10. However, this is not required, and other methods can be used to supply electrical power to the fixture, as discussed in more detail below in reference to FIGS. 6(a)-6(c).

The exemplary detachable power pack 64 of the light fixture 10 includes two ballasts 48, for example a model 49776 electronic ballast available from GE Lighting of Cleveland, Ohio. However, this is not required, and other makes and models of ballasts can be employed with the present invention. Further, while the exemplary light fixture 10 includes two ballasts 48, a greater or lesser number of ballasts 48 can be used.

Each ballast 48 has a first (input) end 50 and a second (output) end 52. Power input wiring 54 electrically connects the modular power input connector 56 to the first end 50 of each ballast 48. As discussed in more detail below in reference to FIGS. 9-10, the modular power input connector 56 mates with a modular power cord assembly 180 supplying electrical power. The modular power cord assembly 180 is preferably quickly and easily disconnected from the modular power input connector 56 without the use of tools, in order to verifiably and positively remove electrical power from the fixture to reduce the risk of electrical shock during maintenance.

Ballast output wiring 58 electrically connects the second (output) end 52 of each ballast 48 to a modular ballast output connector 60. The modular ballast output connector 60 mates with a corresponding lampholder harness connector 32. The modular ballast output connector 60 is preferably quickly and easily disconnected from the lampholder harness connector 32 without the use of tools.

Each ballast 48 is fastened to the ballast channel cover 36, for example using threaded fasteners to engage mounting ears 62 on each ballast 48 through holes in the ballast channel cover 36. However, threaded fasteners are not required and other means can be utilized to fasten each ballast 48 to the ballast channel cover 36, such as adhesives or interference mounting techniques.

When the ballast 48 is secured to the ballast channel cover 36, the modular power input connector 56 preferably extends through the aperture 42 for connection to a modular power cord assembly 180 (not shown in FIGS. 1-5). The ballast channel cover 36 is preferably positioned above the ballast 48, with good thermal contact between the ballast 48 and ballast channel cover 36, so waste heat generated by the ballast 48 conducts upwardly to the ballast channel cover 36. The ballast channel cover 36 is preferably positioned at the top of the fixture 10, and exposed to air circulation so waste heat from the ballast can radiate away from the light fixture.

Figure 1:
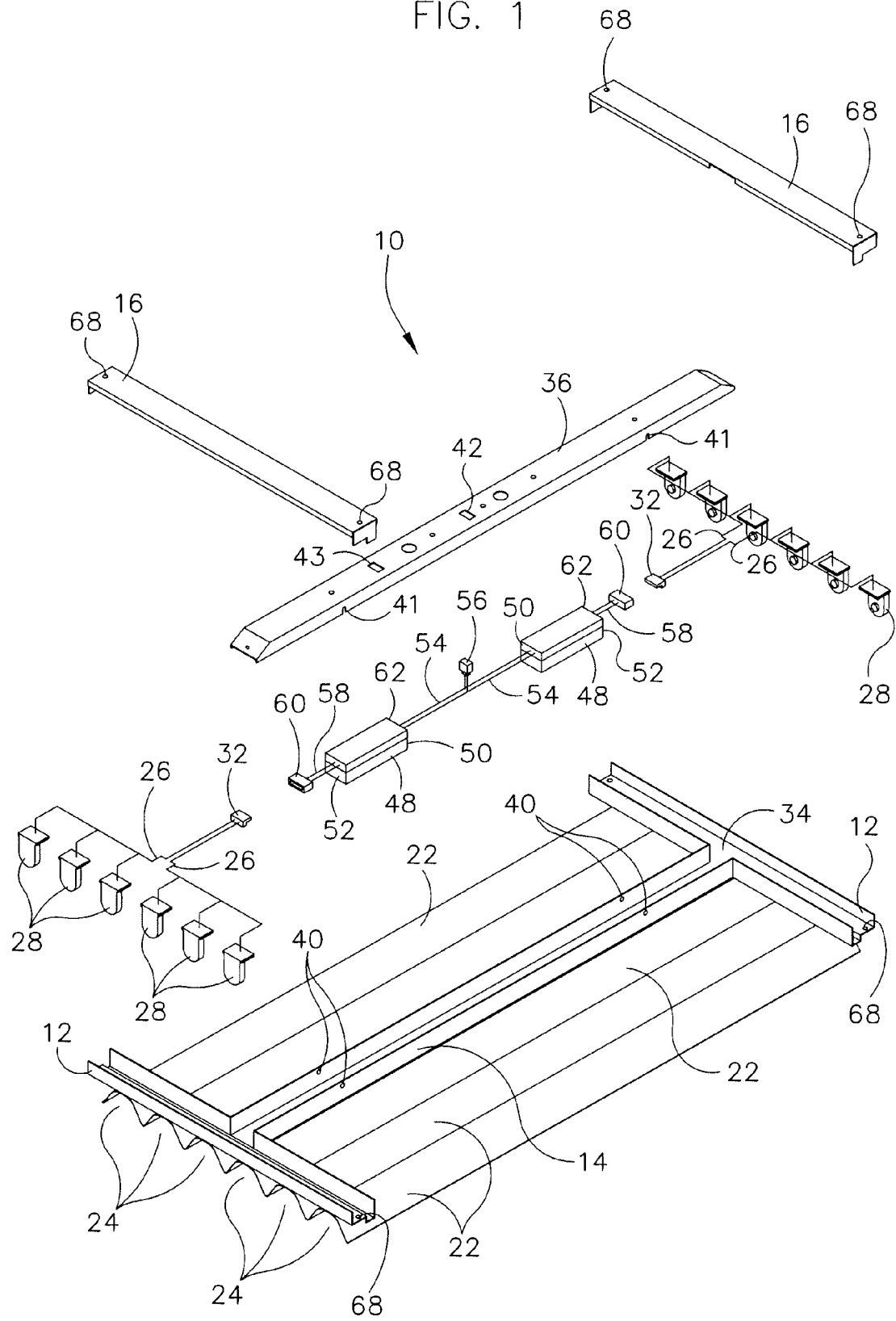
FIG. 1 is an exploded perspective view of one embodiment of a light fixture for use in an apparatus and method according to the invention.

In the embodiment of FIG. 1, when the detachable power pack is attached to the fixture body 66, each ballast 48 is housed in the ballast chamber 38, and oriented so that the modular ballast output connectors 60 of the power pack 46 can mate with the modular lampholder harness connectors 32 of the lampholder harnesses 26.

When the modular ballast output connectors 60 mate with the modular lampholder harness connectors 32, the ballasts 48 are electrically connected to deliver power to the lampholder harnesses 26, the lampholders 28, and the lamps 30 (not shown in FIGS. 1-5). Suitable mating modular ballast output connectors 60 and modular lampholder harness connectors 32 are a male and female connector pair available as models 231-604 and 231-104/02600 from Wago Corp. of Germantown, Wis. However, this is not required and other types, makes and models of mating modular connectors can be used with the present invention.

FIGS. 4 and 5 are perspective views of the light fixture of FIG. 1, with the detachable power pack 64 separated from the fixture body 66 of the light fixture 10. The following discussion of exemplary methods for modifying or servicing a light fixture according to another aspect of the invention is by way of explanation, and is not necessarily a limitation on the scope of the invention as defined by the claims. Replacing the detachable power pack 64 in a light fixture 10, for example to change the ballast characteristics in response to changing light requirements or to service a failed ballast, is straightforward and does not necessarily require a high level of skill or the use of tools.

First, the modular power cord 180 is disconnected from the modular power input connector 56, thereby positively and verifiably cutting off electrical power from the light fixture 10 to improve the safety of the procedure. Second, the old detachable power pack 64 is separated from the body 66 of the light fixture by uncoupling the cover clip portions 41 from the body clip portions 40, and by disconnecting the modular ballast output connectors 60 from their corresponding lampholder harness connectors 32. The old power pack 64 can then be set aside for eventual disposal or repair.

When reassembling the light fixture 10 with a new or replacement power pack 64, the reverse of the above procedure is performed. First, the ballast output connectors 60 on the new power pack 64 are mated with their corresponding lampholder harness connectors 32. Next, the new power pack 64 is detachably fastened to the body 66 of the light fixture by coupling the cover clip portions 41 with the body clip portions 40. Finally, modular power cord 180 is reconnected to the modular power input connector 56 to restore power to the light fixture 10 for normal operation.

It should be noted that the present invention can be employed with other fixtures, and the invention is not limited to the light fixture shown and described herein. For example, another fluorescent tube light fixture embodiment in which the present invention can be employed is that shown and described in U.S. Pat. No. 6,585,396, which is hereby incorporated by reference.

Figure 6A:
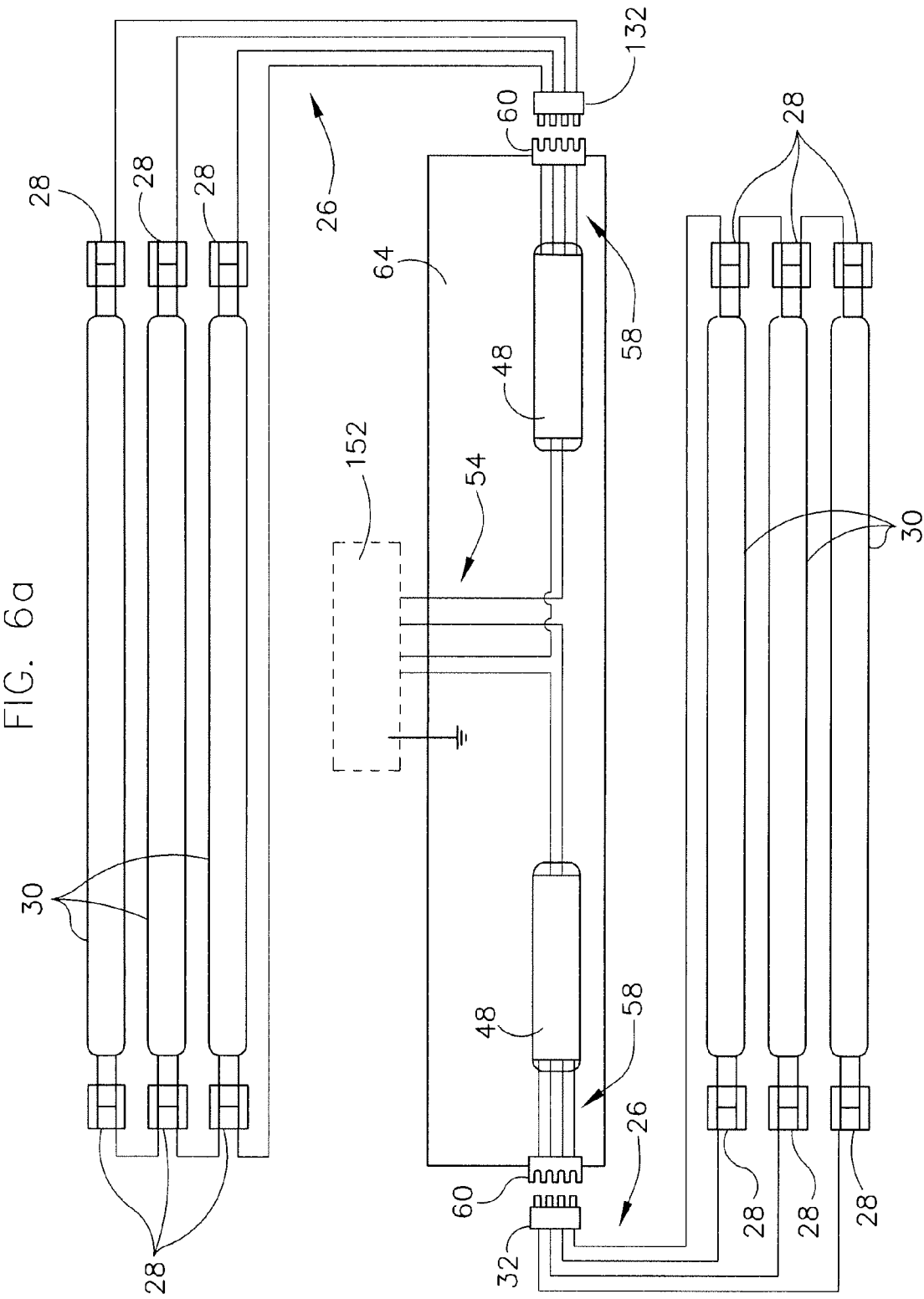
FIGS. 6(a)-6(c) are circuit diagrams for light fixtures according to the invention having detachable ballast assemblies with hard-wired, armored whip, and modular connector input power configurations, respectively.
Figure 6B:
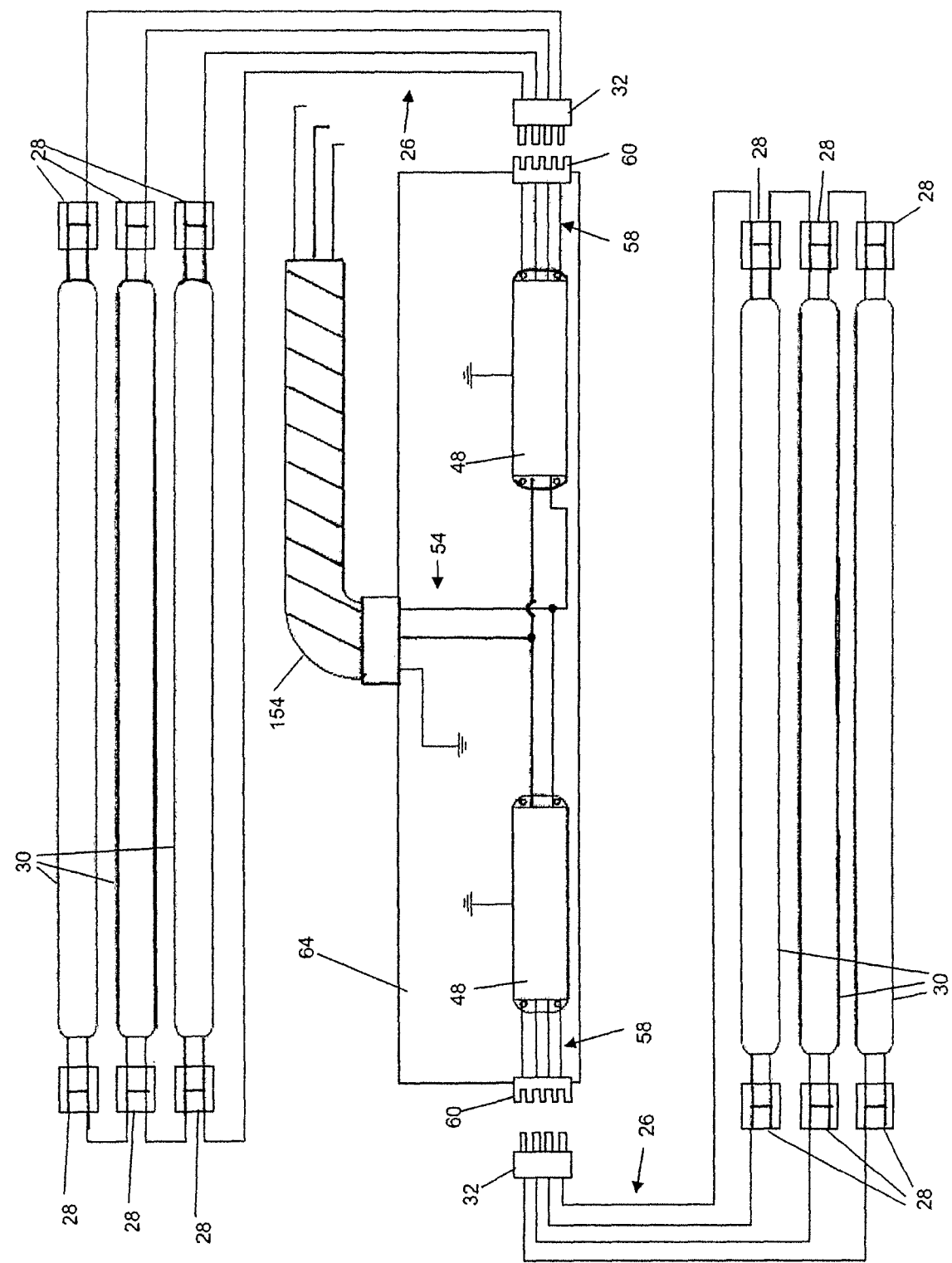
Figure 6C:
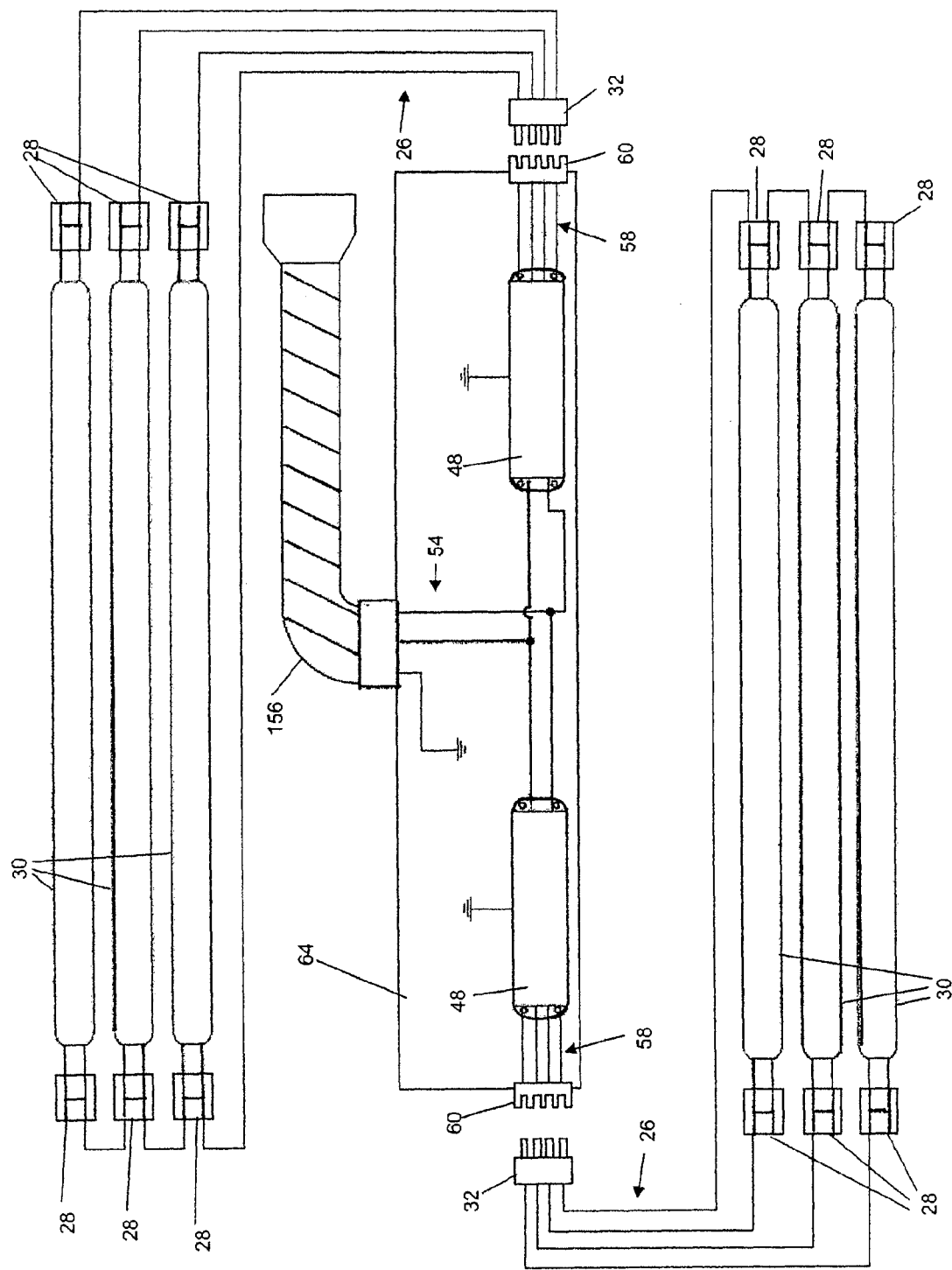

FIGS. 6(a)-6(c) are circuit diagrams for light fixtures according to the invention having detachable ballast assemblies with alternative input power configurations. A variety of alternative input power configurations are preferably provided to allow a light fixture according to the invention to be used with a variety of available power sources. These alternative input power configurations can be classified generally into "hard wire" configurations, and "modular" configurations. A light fixture according to the invention can include either input power configuration.

FIGS. 6(a) and 6(b) show examples of hard wire input power configurations. The detachable power pack 64 of FIG. 6(a) includes a hard wire power supply connector 152. The hard wire power supply connector 152 represents a connection which is hard wired directly to a branch circuit in the building, for example by an electrician. The detachable power pack 64 of FIG. 6(b) includes one type of hard wire power supply connector, an armored whip power supply line 154.

The detachable power pack 64 of FIG. 6(c) includes a modular wiring system power supply line 156. An alternative, "daisy chain" modular wiring system power supply line is described, for example, in U.S. Pat. No. 6,746,274, the contents of which are incorporated by reference.

While the exemplary circuit diagrams of FIGS. 6(a)-6(c), and the disclosure of U.S. Pat. No. 6,746,274 show specific combinations of input power configurations with particular types of ballasts, these specific combinations are not required. It should be understood that any of these input power configurations can be used with a light fixture according to the invention, as appropriate for the environment in which the light fixture is to be installed. It should also be understood that any of these power supply configurations can be used with any type of ballast, not just the particular types of ballasts shown in FIGS. 6(a)-6(c).

FIGS. 7(a)-7(e) are circuit diagrams for light fixtures according to the invention having detachable ballast assemblies with alternative ballast configurations. Advantageously, such a variety of alternative ballast configurations can allow a light fixture according to the invention to provide a wider variety of light levels at varying power consumption levels.

Figure 7A:
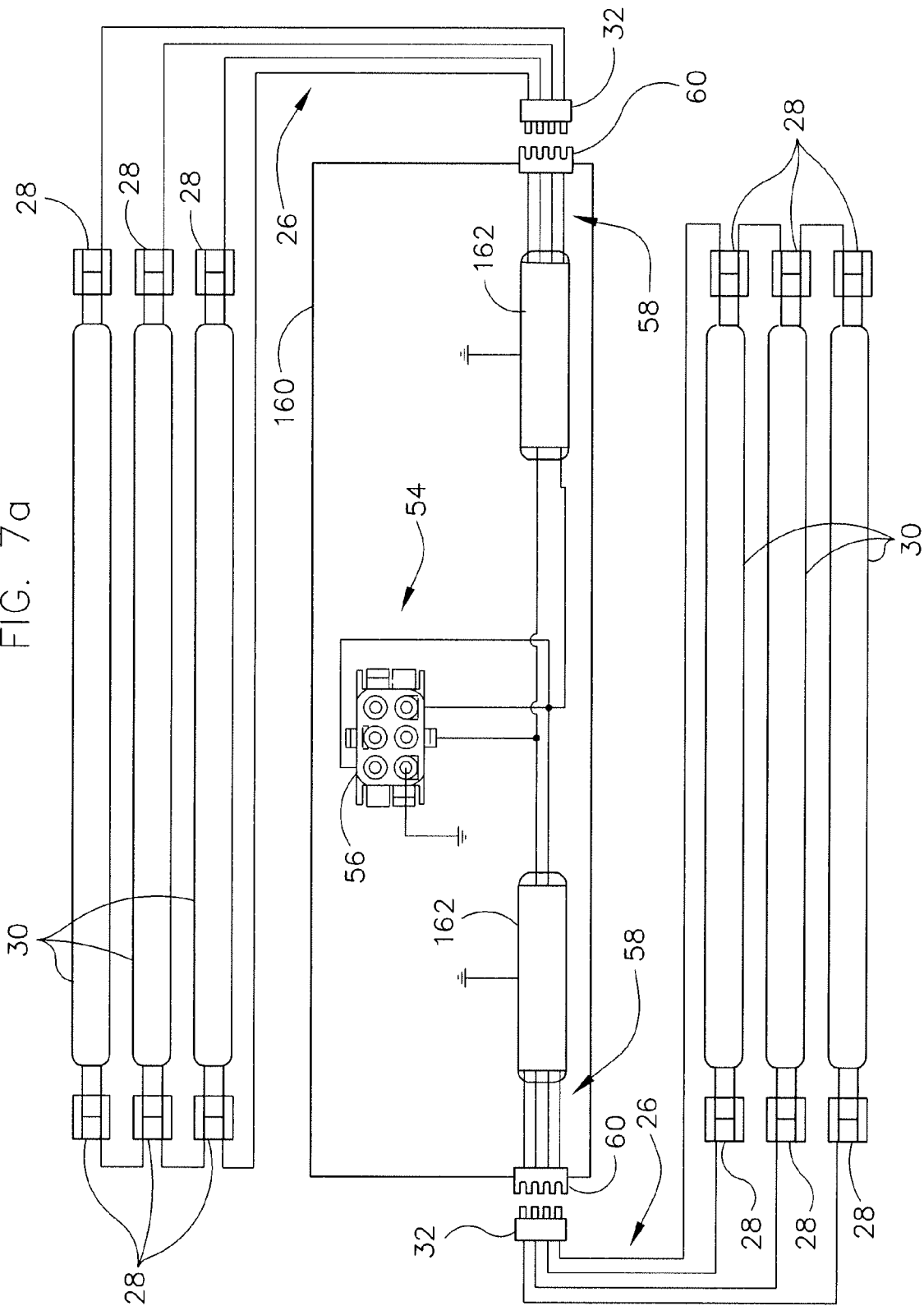
FIGS. 7(a)-7(e) are circuit diagrams for light fixtures according to the invention having detachable ballast assemblies with normal ballast factor, low ballast factor, high ballast factor, dual switch/high ballast factor, and battery backup/high ballast factor configurations, respectively.

The detachable power pack of FIG. 7(a) is a high ballast factor detachable power pack 160 that includes a high ballast factor ballast 162.

Figure 7B:
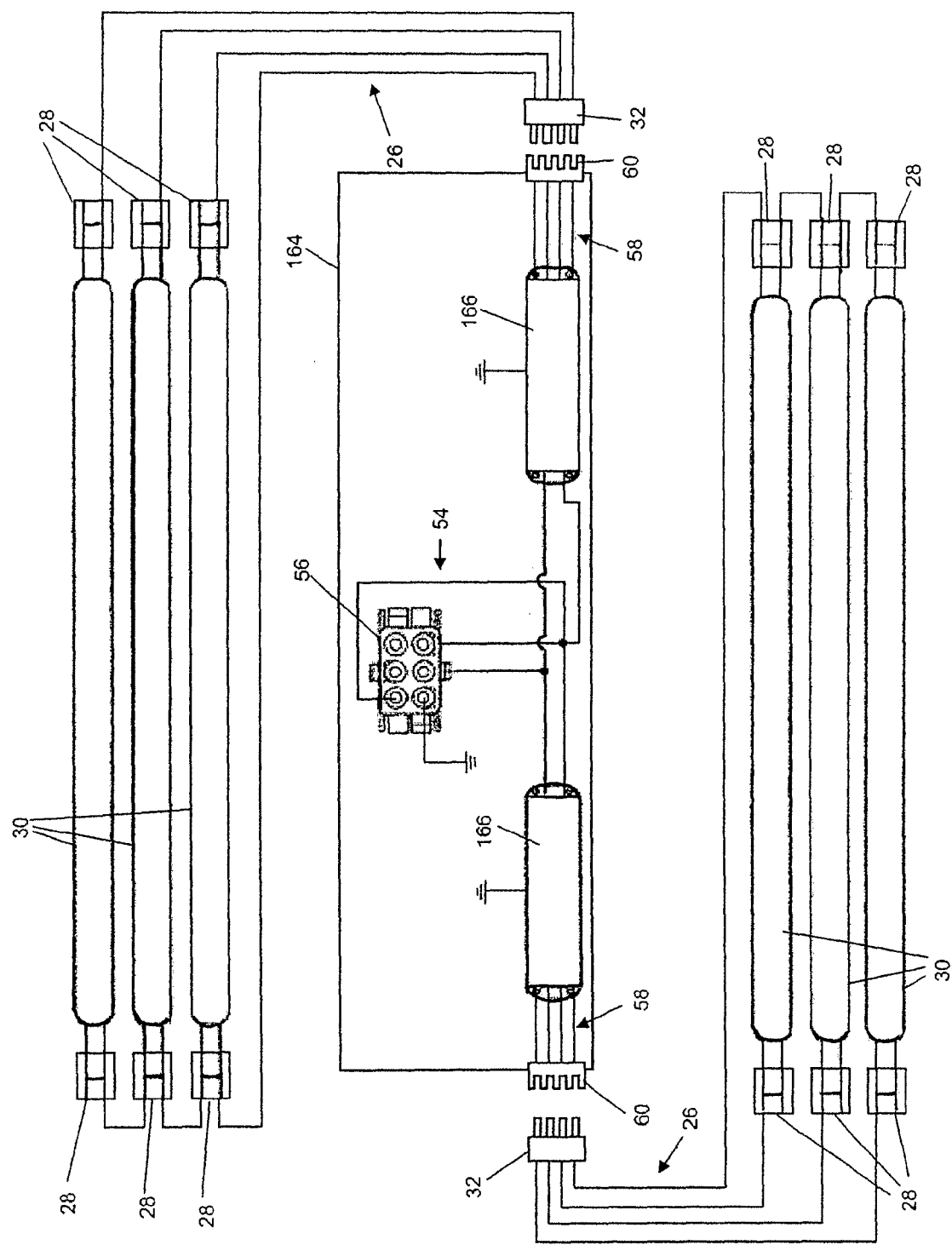

The detachable power pack of FIG. 7(b) is a normal ballast factor detachable power pack 164 that includes a normal ballast factor ballast 166.

Figure 7C:
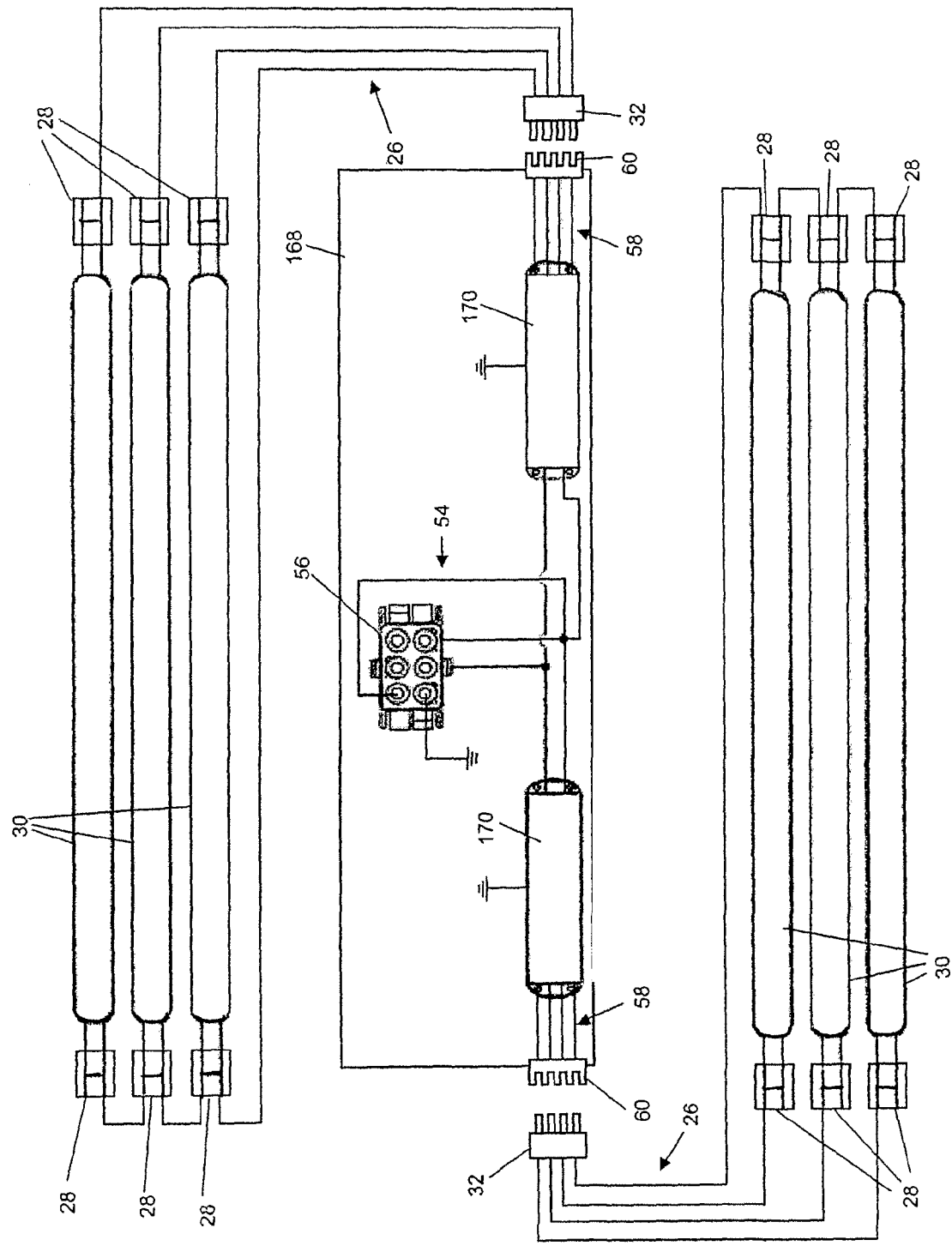

The detachable power pack of FIG. 7(c) is a low ballast factor detachable power pack 168 that includes a low ballast factor ballast 170.

Figure 7D:
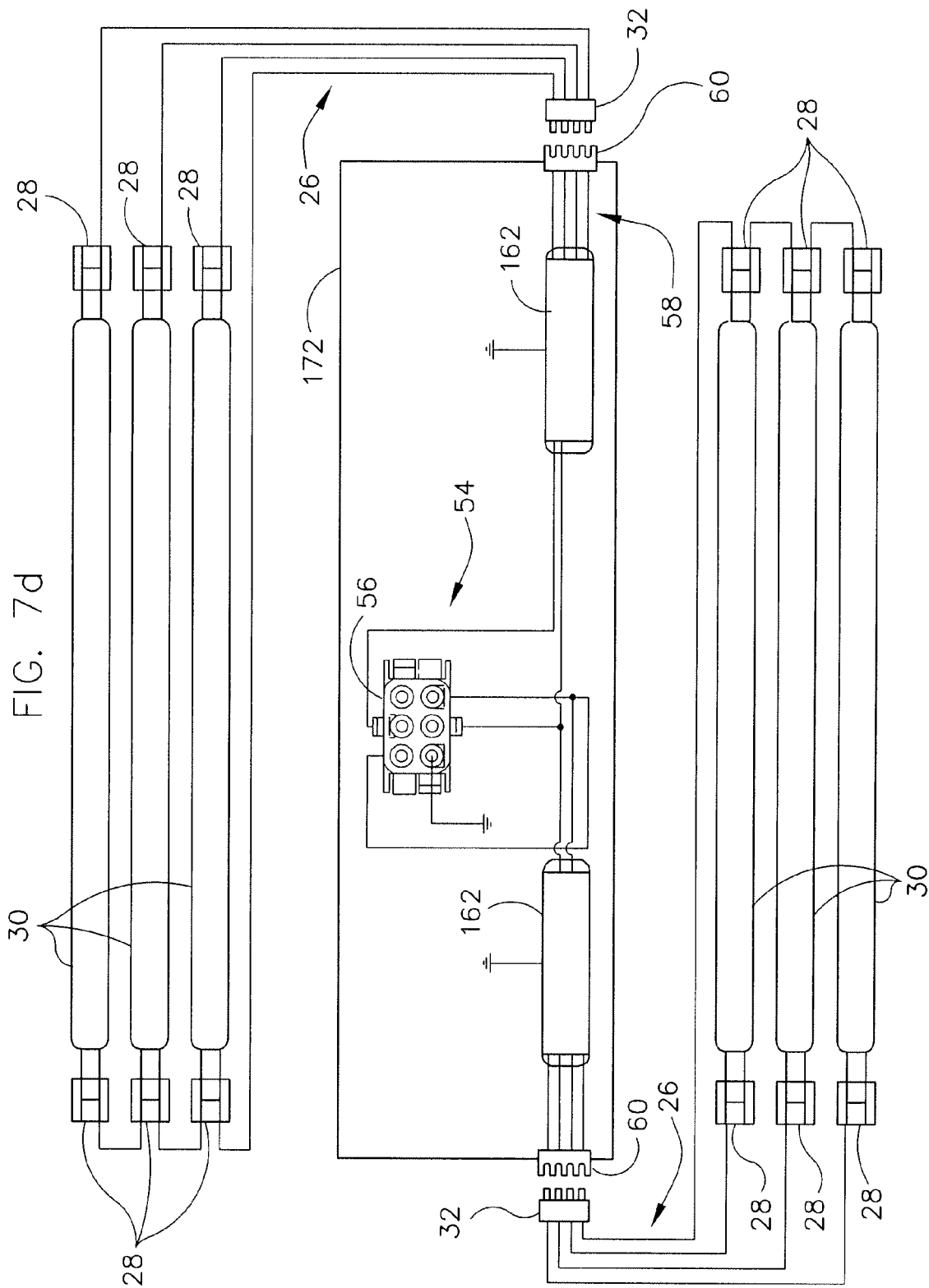

The detachable power pack of FIG. 7(d) is a dual switched detachable power pack 172 that includes two high ballast factor ballasts 162 that receive independent power on separate lines from the modular power input connector 56.

Figure 7E:
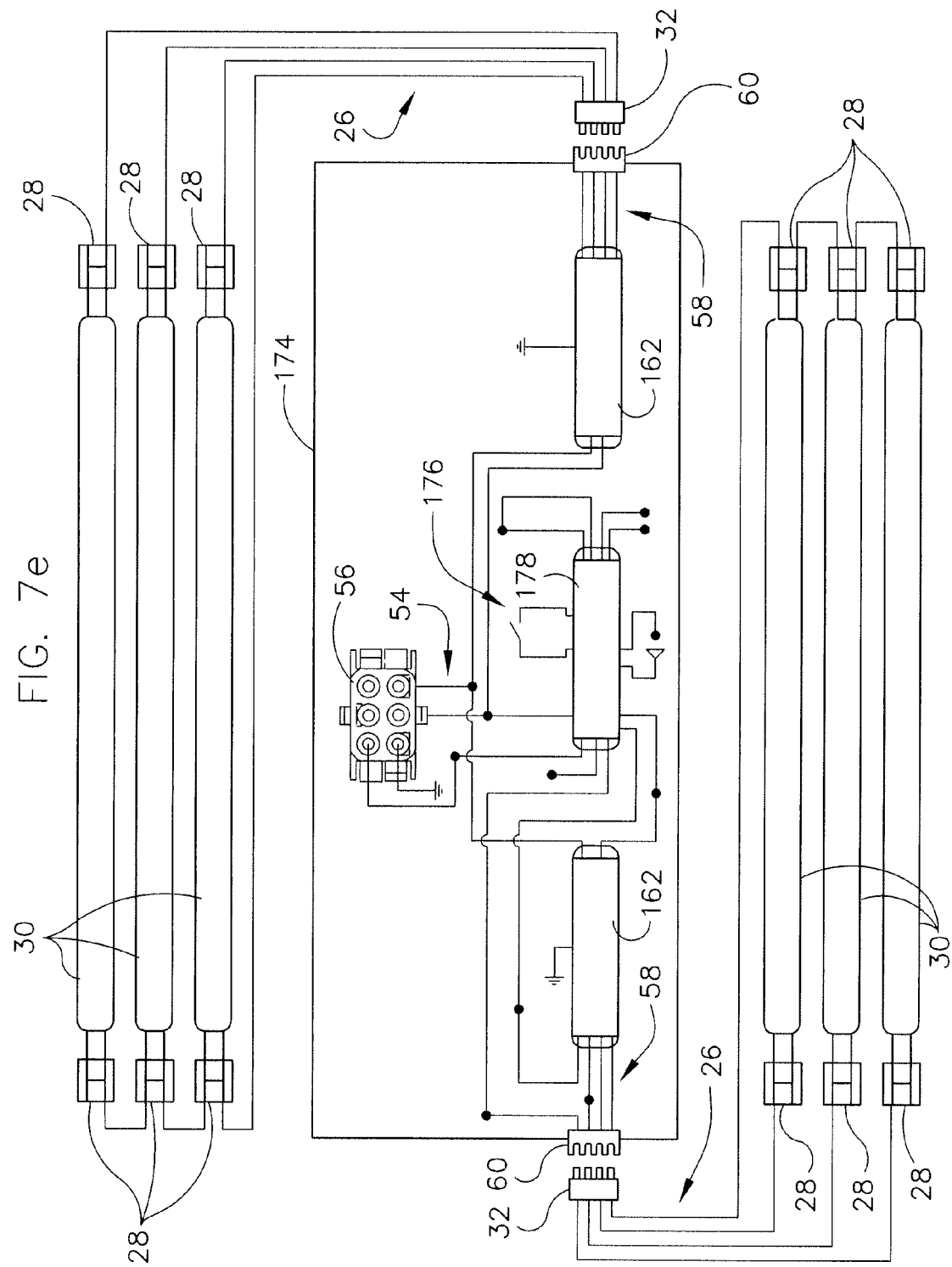

The detachable power pack of FIG. 7(e) is a battery backup detachable power pack 174 that includes battery backup circuitry 176, a battery backup ballast 178, and two high ballast factor ballasts 162. The battery backup ballast 178 can supply lighting in the event of a failure of the main electrical supply, for example in the case of a natural disaster or fire.

Figures 8A, 8B:
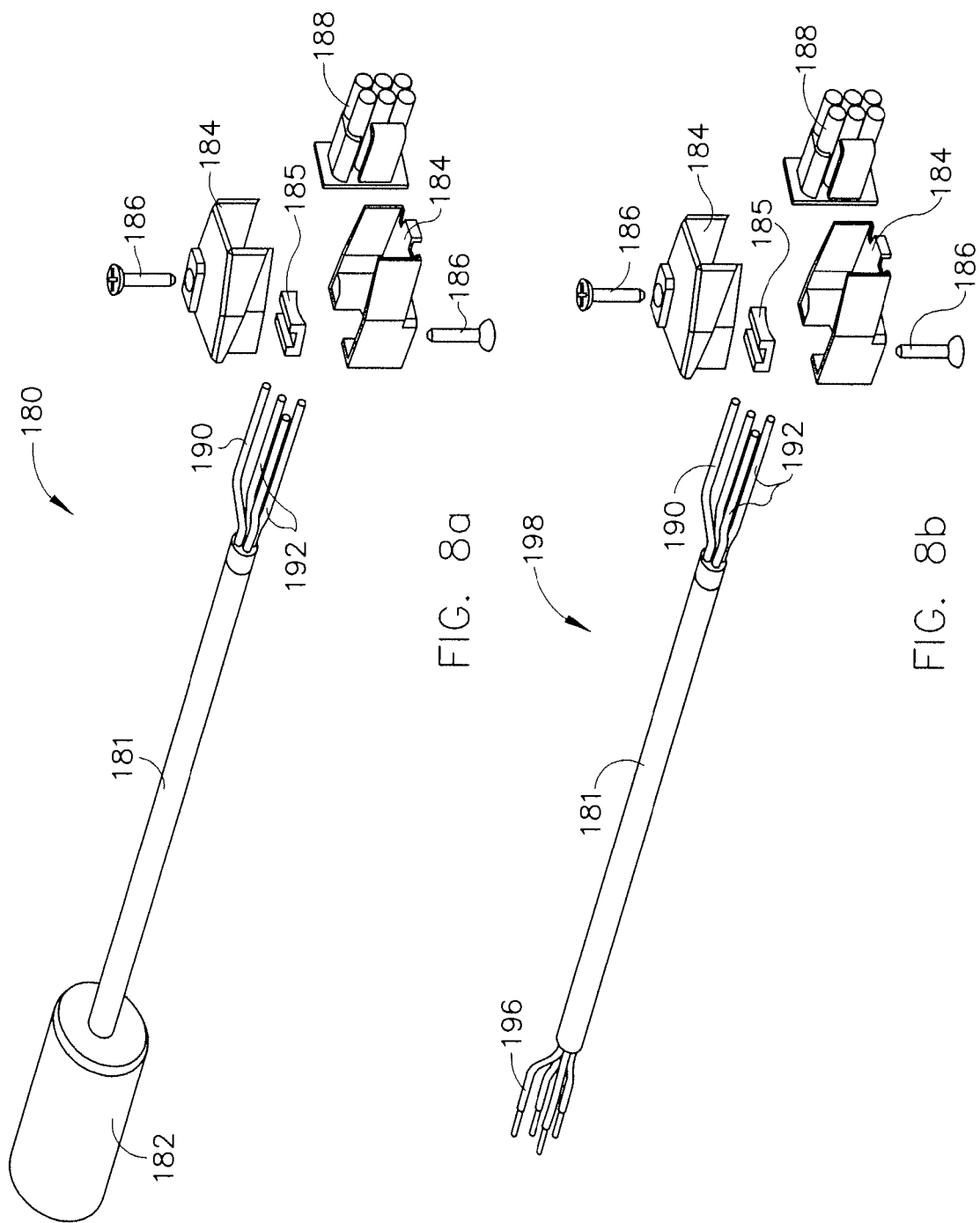

FIG. 8(a) shows a modular power cord assembly 180 having a first end that terminates in a polarized modular power supply plug, and a second end that terminates in a conventional power plug 182.

The modular power cord assembly 180 includes a suitable length of conventional insulated power cord 181 with 3 or 4 insulated conductors surrounded by an insulated jacket. The power cord 181 can be any standard electrical power cord having suitable power handling and other specifications, for example 18 gauge 3-conductor or 18 gauge 4-conductor power cord can be used. In a preferred embodiment of the invention, a variety of cord lengths, for example from 3' to 35' in length, are kept in stock, allowing the appropriate cord length to be chosen from stock at the time the light fixture is installed, without requiring any delay for custom manufacturing of a modular power supply cord having the appropriate length.

The polarized modular power supply plug is preferably a 6-pin "Mate-N-Lock" plug connector of the type sold by the AMP division of Tyco Electronics of Harrisburg, Pa. However, this is not required and other types, makes and models of modular power supply connectors can be used with the present invention. The polarized modular power supply plug preferably includes strain relief, for example two strain relief pieces 184 and a plastic insert 185 (such as AMP P/N 640715-1), and a plug body 188. The strain relief 184, plastic insert 185, and plug body 188 can be held together with screws 186, such as #6×⅝" sheet metal screws.

In a preferred embodiment, the plug body 188 has six positions for holding electrical pins, although a plug body having a greater or lesser number of pin positions could be used. A short portion of the insulation is stripped from the end of each conductor in the electrical cord 181, and an electrical pin is electrically and mechanically connected to the stripped portion. The electrical pins and attached conductors are then inserted into specific pin positions in the plug body 188 to form a polarized modular power supply plug 158, as discussed in more detail below in reference to FIGS. 10(a)-10(j).

The "extra long" electrical pin 190 used for the green (safety ground) line is preferably slightly longer than the "standard length" electrical pins 192 used for the black (power supply or "hot"), white (power return or neutral), and red (switched power) lines. This helps ensure that the safety ground connection is made first and broken last when the plug 158 is inserted into or removed from its corresponding socket. A suitable extra long electrical pin 190 for the safety ground would be AMP PN 350669, and a suitable standard length electrical pin 192 for the other lines would be AMP PN 350547-1.

The conventional power plug 182 can be any standard electrical plug configuration, such as a NEMA 5, NEMA L5, NEMA L7, NEMA 6, or NEMA L6 plug. In a preferred embodiment of the invention, a variety of plug configurations are kept in stock, allowing the appropriate plug configuration to be chosen from stock at the time the light fixture is installed, without requiring any delay for custom manufacturing of a modular power supply cord having the appropriate plug configuration.

FIG. 8(b) shows an alternative modular power cord assembly 198 having a first end that terminates in a polarized modular power supply plug, and a second end that terminates in stripped conductors 196, preferably about ⅜" in length. The modular power cord assembly 198 is similar in construction to the modular power cord assembly 180, except that the modular power cord assembly 198 terminates in stripped conductors 196 that can be used, for example, to hardwire the fixture to building power, and the modular power cord assembly 198 is wired for "universal" application. FIG. 8(c) shows a "dual switch" modular power cord assembly 199 that is otherwise similar in construction to the modular power cord assembly 198.

FIG. 9 shows exemplary power input wiring 54 for a detachable power pack in a light fixture according to the invention. The exemplary power input wiring 54 includes at least 3 insulated conductors, including a safety ground (green) wire 200, a power return (white) wire 202, and a power supply (black) wire 204. Depending on the application, the power input wiring 54 may also include a switched power (red) wire 206, and a second power supply (black) wire 204. Each conductor is made of a suitable length of insulated wire, for example UL 1015 18 AWG wire rated for 105° C. and 600V can be used.

One end of the power input wiring terminates in a modular power input connector 56, which is preferably a polarized modular power input socket 210 such as a 6-pin "Mate-N-Lock" socket connector of the type sold by the AMP division of Tyco Electronics of Harrisburg, Pa.

In a preferred embodiment, the polarized modular power input socket 210 includes a socket body 208 having six positions for holding single conductor sockets, although a socket having a greater or lesser number of single conductor socket positions could be used. A short portion of the insulation is stripped from the end of each conductor, and a single conductor socket 193, for example AMP PN 350550-1, is electrically and mechanically connected to the stripped portion, for example by crimping and/or soldering. The single conductor socket 193 and attached conductor are then inserted into a specific single conductor socket position in the socket body 208 to form the polarized modular power input socket 210, as discussed in more detail below in reference to FIGS. 10(a)-10(j).

Figure 10A:
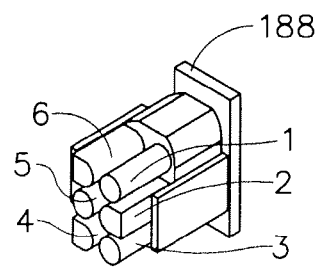
FIGS. 10(a)-10(j) show exemplary pin assignments for the input power plug and socket connectors in various configurations for use according to the invention.
Figure 10B:
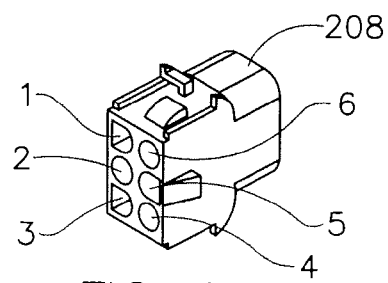

FIGS. 10(a)-10(j) shows exemplary pin assignments for the input power plug and socket connectors in various configurations of a detachable power pack for use in a light fixture according to the invention. However, these pin assignments are not required, and other pin assignments could be used. FIGS. 10(a) and 10(b) illustrate a convention for numbering the pins (1-6) in the input power plug and socket connectors.

Figure 10C:
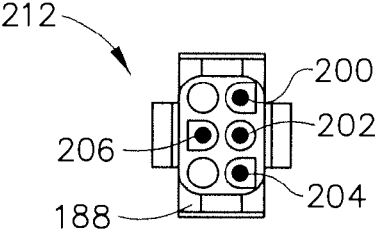
Figure 10D:
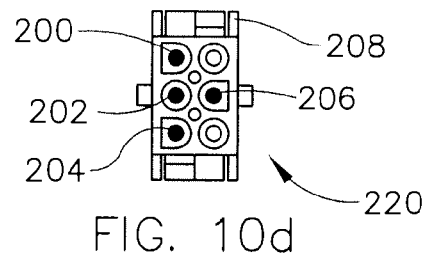

FIGS. 10(c) and 10(d) illustrate an exemplary 120V power supply configuration. The exemplary 120V power supply configuration uses a 120V modular power supply plug 212 along with a 120V modular power input socket 220. The plug 212 and socket 220 each include at least a safety ground (green) wire 200, a power return (white) wire 202, and a power supply (black) wire 204 located at specific positions in plug head 188 and socket head 208, respectively. When used in a 120V dual-switched configuration, the plug 212 and socket 220 also include a second power (red) wire 206.

Figure 10E:
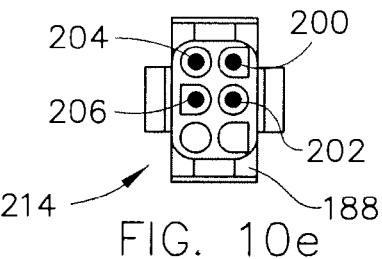
Figure 10F:
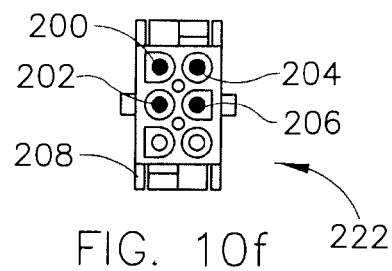

FIGS. 10(e) and 10(f) illustrate an exemplary 277V power supply configuration. The exemplary 277V power supply configuration uses a 277V modular power supply plug 214 along with a 277V modular power input socket 222. Like the 120V plug 212 and 120V socket 220, the 277V plug 214 and the 277V socket 222 each include at least a safety ground (green) wire 200, a power return (white) wire 202, and a power supply (black) wire 204. The safety ground (green) wire 200 and the power return (white) wire 202 of the 277V configuration are at the same pin positions as in the 120V configuration, however the power supply (black) wire 204 is at a different pin position. When used in a 277V dual-switched configuration, the plug 214 and socket 222 also include a second or switched power (red) wire 206.

Figure 10G:
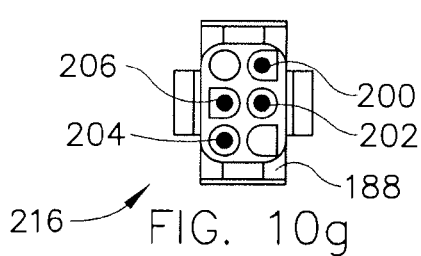
Figure 10H:
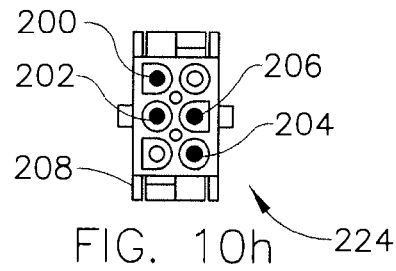

FIGS. 10(g) and 10(h) illustrate an exemplary 347/480V poser supply configuration. The exemplary 347/480V power supply configuration of uses a 347/480V modular power supply plug 216 along with a 347/480V modular power input socket 224. Like the 120V and 277V configurations, the 347/480V plug 216 and the 347/480V socket 224 each include at least a safety ground (green) wire 200, a power return (white) wire 202, and a power supply (black) wire 204. The safety ground (green) wire 200 and the power return (white) wire 202 of the 277V configuration are at the same pin positions as in the 120V and 277V configurations, however the power supply (black) wire 204 is at a different pin position. When used in a 347/480V dual-switched configuration, the plug 216 and socket 224 also include a second or switched power (red) wire 206.

Figure 10I:
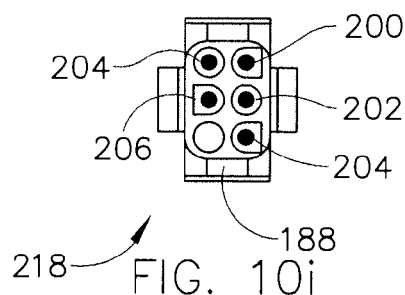
Figure 10J:
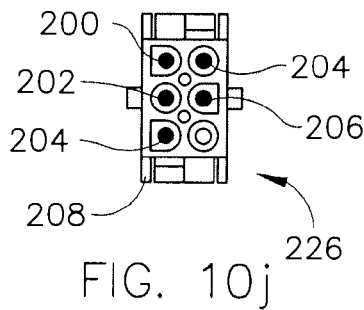

FIGS. 10(i) and 10(j) illustrate an exemplary "UNV" or "universal" power supply configuration. The exemplary "UNV" or "universal" power supply configuration of uses a UNV modular power supply plug 218 along with a UNV modular power input socket 226. A light fixture wired with the UNV power supply socket configuration can be used with either a 120V supply cord or a 277V supply cord. A light fixture wired with the 120 v power supply socket configuration can be used with either a 120V supply cord or a UNV supply cord. A light fixture wired with the 277 v power supply socket configuration can be used with either a 277V supply cord or a UNV supply cord.

The UNV plug 218 and the UNV socket 226 each include at least a safety ground (green) wire 200 and a power return (white) wire 202, in the same pin and socket positions as the 120V, 277V, and 347/480V configurations. However, the UNV plug 218 and the UNV socket 226 each include two power supply (black) wires 204, one power supply (black) wire 204 at each of the two pin positions used for the power supply (black) wire 204 in the 120V and 277V configurations. When used in a 120V or 277V dual-switched configuration, the plug 218 and socket 226 also include a second or switched power (red) wire 206.

Figure 12A:
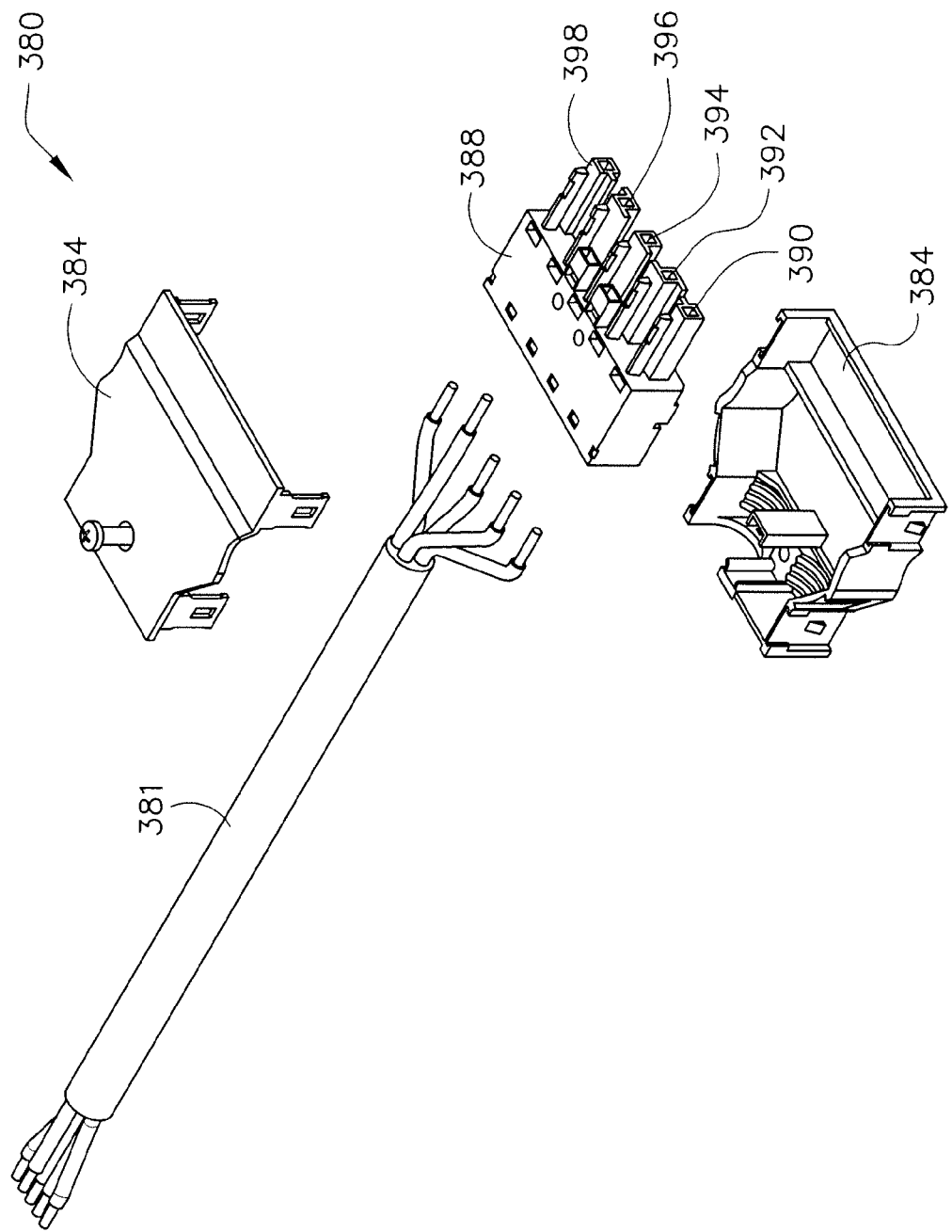
FIGS. 12(a) and 12(b) are perspective views of modular power supply cords and connectors according to another exemplary embodiment.
Figure 12B:
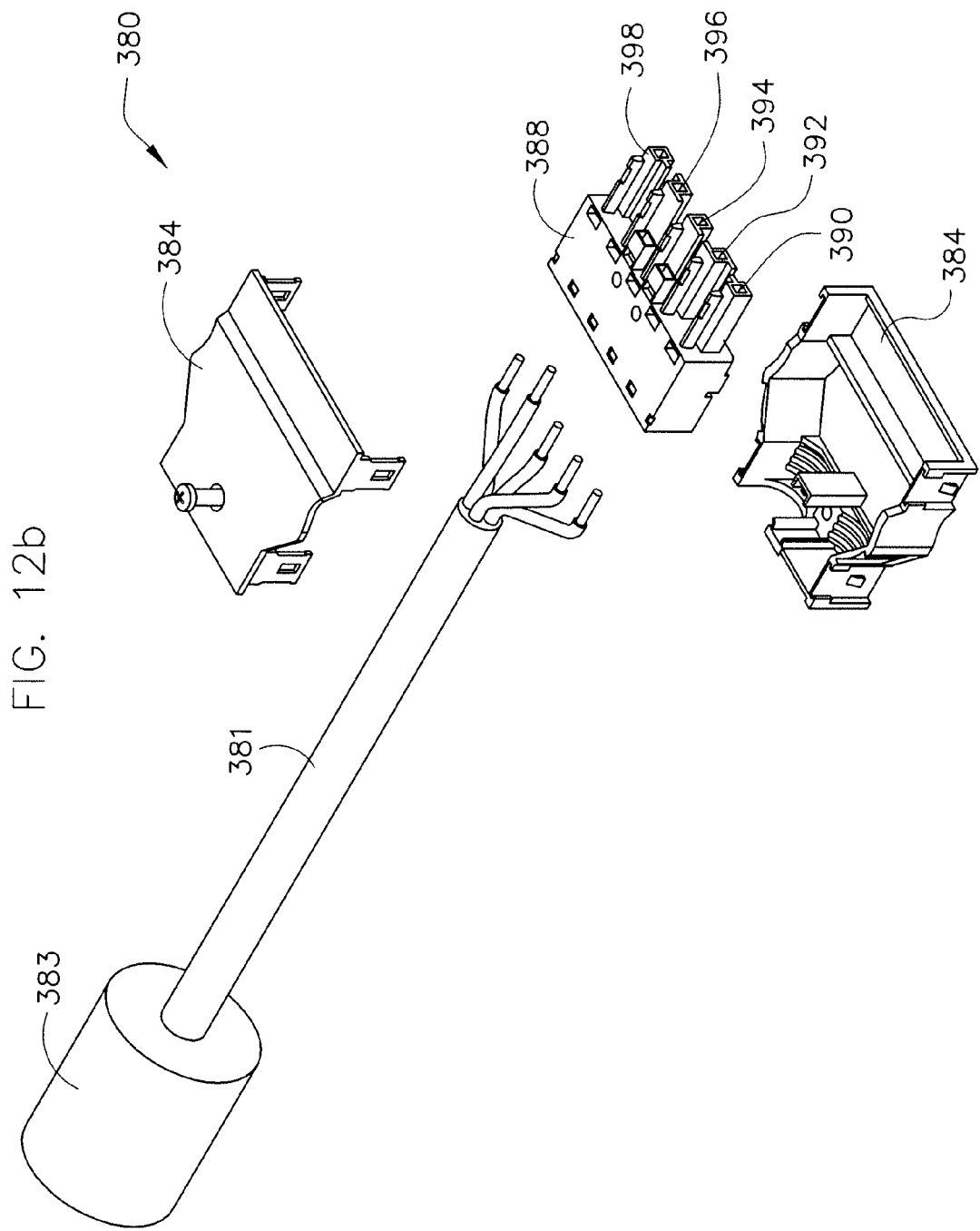

Referring to FIGS. 12(a) and 12(b), another polarized modular power supply connector (e.g. power input connector) is shown according to an exemplary embodiment and includes a plug portion 380 (the corresponding socket portion is shown in FIG. 13(b)). The polarized modular power supply plug is preferably a five-pin "Winsta" type plug-in connector of the type sold by the WAGO Corporation of Germantown, Wis. However, this is not required and other types, makes and models of modular power supply connectors can be used with the present invention. The plug portion 380 of the polarized modular power supply connector preferably includes strain relief, for example two strain relief pieces 384, and a plug body 388. The strain relief 384 and plug body 388 can be held together with screws, such as #6×⅝" sheet metal screws, or other suitable fastener.

In a preferred embodiment, the plug body 388 has ten positions for holding electrical wires, although a plug body having a greater or lesser number of wire positions could be used (e.g., such as eight wire positions). A short portion of the insulation is stripped from the end of each conductor in the electrical cord 381 and are then inserted into specific wire positions in the plug body 388 to form a polarized modular power supply connector, as discussed in more detail below in reference to FIGS. 13(a) and 13(b). Electrical cord 381 provides a flexible electrical power supply line that is connectable with a power source in a building through a connector 383 (shown in FIG. 12(b)) or by hardwiring individual conductors (shown in FIG. 12(a)). According to one embodiment, a plurality of electrical cords 381 are disposed at locations throughout a building at locations corresponding to light fixture installations and have one end pre-wired to a power supply within the building and the other end pre-wired to a plug (or socket) portion, so that the light fixtures may be pre-assembled at a factory with a socket (or plug) portion of the connector within the ballast cover, and then shipped to the building, installed at the appropriate locations in the building, and then electrically connected simply by connecting the socket and plug portions of the connector for each light fixture.

Referring further to FIG. 13(a), the plug portion 380 of the modular power supply connector is shown by way of example to include five conductive projections (e.g. pins, posts, pegs, prongs, etc.) 390, 392, 394, 396 and 398. However, according to other embodiments, any number of projections, such as four, eight, etc. may be provided to suit an intended number of conductors for a particular lighting application. Each of the projections 390, 392, 394, 396 and 398 are shown to include a substantially square cross section with a hollow interior. The projections are also shown to include one or more extensions (e.g. ribs, ridge, etc.) extending longitudinally from the square cross section of the projection to mate with a corresponding receptacle or socket in a corresponding socket portion of the modular connector, shown as power input connector 456 in FIG. 13(b). By way of example, "outside" projections 390 and 398 are shown to include an extension 400 extending from a mid section of the projections, and "inside" projections 392 and 396 are each shown to have a pair of extensions, 402 and 404, extending from a top and bottom of the projection respectively and parallel to one another, and "center" projection 394 include an extension 406 extending from a top side of the projection. According to alternative embodiments, the extensions may be arranged in any suitable pattern or arrangement to ensure proper orientation and mating of the plug portion 380 and the socket portion 456 of the power input connector.

Each of the projections and their extension(s) are configured to be received in a mating conductive recess or socket, shown as conductor sockets 490, 492, 494, 496 and 498 in the socket portion 456 of the connector (e.g. power input connector—shown in FIG. 13(b)). Each of conducting sockets 490, 492, 494, 496 and 498 includes a cross sectional shape corresponding to the pattern of extensions provided on the projections 390, 392, 394, 396 and 398, and is electrically and mechanically connected to power input wiring 54 (in the manner as shown in FIG. 4). In a manner similar to the socket portion of modular power input connector 56, socket portion 456 provides another embodiment of a modular connector portion that extends through, and is retained within, aperture 42 in the ballast channel cover 36 for use in making a rapid connection, and a rapid "live-load" disconnection, of the plug portion 380 from the socket portion 456 without removal of the ballast channel cover 36 or other portion of the fixture.

Figure 11:
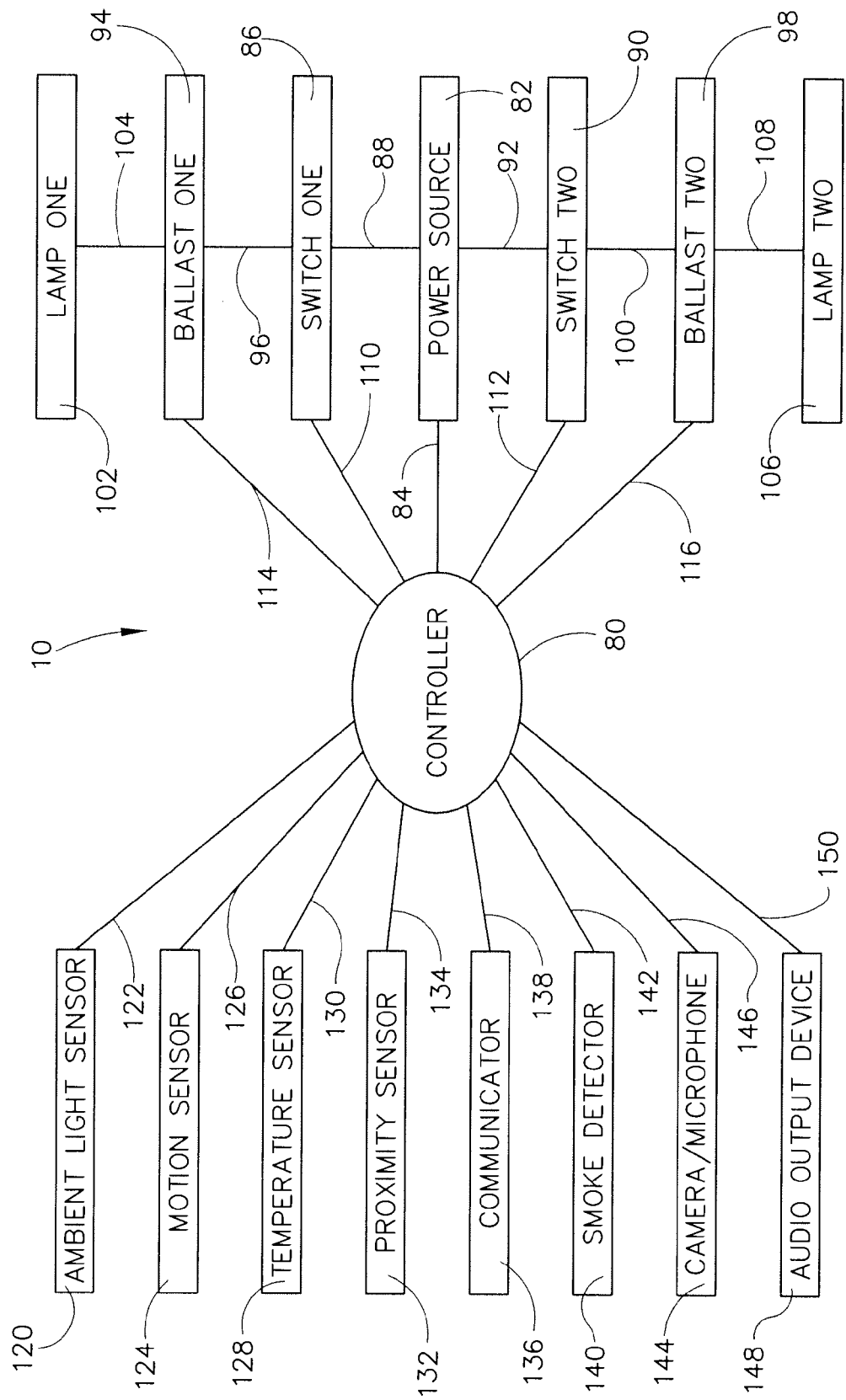
FIG. 11 is a block diagram of a controller and related components in other embodiments of a light fixture according to the invention.

Referring now to FIG. 11, a modular light fixture according to the invention can include a controller 80, for example a microprocessor or microcontroller of the types known in the art. The controller 80 may include suitable non-volatile program memory, for example read-only memory (ROM) such as an electrically programmable read only memory (EPROM or EEPROM). The controller 80 may also include suitable random access memory, for storage of dynamic state variables such as environmental signals and current day/time.

The light fixture preferably includes a power source 82, such as an electrical connector which is connected to line voltage during normal operation, able to deliver electrical power to the controller 80 through a controller power supply line 84.

The light fixture according to the invention preferably includes a plurality of independently controllable lamp circuits. For example, the block diagram of FIG. 6 shows a light fixture with a first independently controllable lamp circuit that includes lamp one 102 and a second independently controllable lamp circuit that include lamp two 106. However, this is not required and a single lamp circuit can be used.

Each independently controllable lamp circuit preferably includes a ballast and an optional switch. For example, lamp circuit for lamp one 102 includes a switch one 86 that receives electrical power from the power source 82 on a power supply line 88. The switch one 86 delivers electrical power to a ballast one 94 on a switched power supply line 96, and the ballast one 94 provides power to the lamp one 102 on a ballasted power supply line 104.

The lamp circuit for lamp two 106 preferably includes a corresponding switch two 90 that receives electrical power from the power source 82 on a power supply line 92. The switch two 90 delivers electrical power to a ballast two 98 on a switched power supply line 100, and the ballast two 98 provides power to the lamp two 106 on a ballasted power supply line 108.

Each switch in a lamp circuit, such as switch one 86 and switch two 90, is preferably adapted to be placed into either an open condition (where the switch is an electrical open circuit through which no current flows) or in a closed condition (where the switch is an electrical closed circuit through which current can flow). To maximize efficiency, a mechanical relay switch, instead of a solid state switch, can be used so that essentially no trickle current passes through the switch when the switch is in an open condition.

The open or closed condition of each switch is preferably independently controllable by the controller 80. For example, the controller 80 can be connected to switch one 86 by a switch control line 110, whereby the controller can place switch one 86 into either a closed or an open condition. Similarly, the controller 80 can be connected to switch two 90 by a switch control line 112, whereby the controller can place switch two 90 into either a closed or an open condition.

Each ballast in a lamp circuit, such as ballast one 94 and ballast two 98, is preferably dimmable to allow the light output from its lamp to be adjusted by the controller 80. For example, the controller 80 can be connected to ballast one 94 by a ballast control line 114, so the controller can adjust the power output of ballast one 94 to adjust the light output from lamp one 102. Similarly, the controller 80 can be connected to ballast two 98 by a ballast control line 116, so the controller can adjust the power output of ballast two 98 to adjust the light output from lamp two 106.

The light fixture can include one or more sensors to provide information about the environment in which the light fixture operates. For example, the fixture can include an ambient light sensor 120 providing an ambient light signal to the controller 80 on an ambient light signal line 122. Using the ambient light signal, the controller 80 can adjust the light output from the fixture, for example to reduce the artificial light produced by the fixture on a sunny day when ambient light provides adequate illumination, or to increase the artificial light produced by the fixture on a cloudy day when ambient light is inadequate. The sensor can be mounted directly on the light fixture, or it can be mounted elsewhere, such as part of the incoming power cord. For example, in U.S. Pat. No. 6,746,274, the contents of which are incorporated herein by reference, teaches a motion detector built into a modular power cord.

The fixture can include a motion sensor 124 providing a motion signal to the controller 80 on an motion signal line 126. Using the motion signal, the controller 80 can turn on the fixture when the motion signal indicates the presence of motion near the fixture. Similarly, the controller 80 can turn off the fixture when the motion signal indicates the absence of any motion near the fixture.

The fixture can include a temperature sensor 128 providing a temperature signal to the controller 80 on an temperature signal line 130. The temperature signal can indicate, for example, the air temperature in the vicinity of the fixture. Alternatively, the temperature signal can indicate the temperature of the ballast or other components of the light fixture, so that any temperature rise resulting from abnormal operation or impending failure can be promptly detected to avoid ongoing inefficiency, the possibility of a fire, or a catastrophic failure of the ballast.

The fixture can include a proximity sensor 132 providing a proximity signal to the controller 80 on a proximity signal line 134. Using the proximity signal, the controller 80 can turn on the fixture on or off when the proximity signal indicates the presence or absence of a person or other object near the fixture.

The fixture can also include a communicator 136 to allow communication between the controller 80 and an external system (not shown). The communicator can be, for example, of the type commonly known as X-10. For example, the communicator 136 can be connected to the controller 80 for bidirectional communication on a communicator signal line 138. With bidirectional communication, the controller 80 can receive a command from an external system, for example to dim, turn on, or turn off a lamp, and the controller 80 can acknowledge back to the external system whether or not the command has been performed successfully. Similarly, the external system could request the current temperature of the ballast of the fixture, and the controller 80 could reply with that temperature.

However, bidirectional communication is not required and one-way communication could also be used. With one-way communication, the fixture could simply receive and execute commands from an external system without providing any confirmation back to the external system as to whether the command was executed successfully or not. Similarly, the fixture could periodically and automatically transmit its status information to an external system, without requiring any request from the external system for the status information.

The fixture can include a smoke detector 140 providing a smoke detector signal to the controller 80 on a smoke detector signal line 142. Using the smoke detector signal, the controller 80 can provide a local alarm, for example with a flashing light or a siren, whenever the smoke detector signal indicates the presence of a fire or smoke. Similarly, the controller 80 can provide the smoke detector signal to an external system, for example through the communicator 136, to a security office or fire department.

The fixture can include a camera and/or microphone 144 providing a camera/microphone signal to the controller 80 on a camera/microphone signal line 146. The controller 80 can provide the camera/microphone signal to an external system, for example through the communicator 136, to a security office, time-lapse recorder, or supervisory station.

The fixture can include an audio output device 148, for example a speaker. The controller 80 can drive the audio output device 148, for example with an audio signal on an audio signal line 150, to provide an alarm, paging, music, or public address message to persons in the vicinity of the fixture. The alarm, paging, music, or public address message can be received by the controller 80 via the communicator 136 from an external system, although this is not required and the alarm, paging, music, or public address message may be internally generated.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limited.

The use of "including," "comprising," "supporting," or "having" and variations thereof herein is meant to encompass the items listed thereafter and equivalents thereof as well as additional items. The terms "mounted," "connected," "supported," and "coupled" are used broadly and encompass both direct and indirect mounting, connecting, supporting, and coupling. Further, "connected" and "coupled" are not restricted to physical or mechanical connections or couplings, and can include electrical connections or couplings, whether direct or indirect.

Furthermore, and as described in subsequent paragraphs, the specific mechanical configurations illustrated in the drawings are intended to exemplify embodiments of the invention and other alternative mechanical configurations are possible.

It is important to note that the construction and arrangement of the elements of the modular light fixture and other structures shown in the exemplary embodiments discussed herein are illustrative only. Those skilled in the art who review this disclosure will readily appreciate that many modifications are possible (e.g., variations in sizes, dimensions, structures, shapes and proportions of the various elements, values of parameters, mounting arrangements, materials, transparency, color, orientation, etc.) without materially departing from the novel teachings and advantages of the invention.

Further, while the exemplary application of the device is in the field of fluorescent lighting, the invention has a much wider applicability.

The particular materials used to construct the exemplary embodiments are also illustrative. For example, although the reflectors in the exemplary embodiment are preferably made of aluminum, other materials having suitable properties could be used. All such modifications, to materials or otherwise, are intended to be included within the scope of the present invention as defined in the appended claims.

The order or sequence of any process or method steps may be varied or re-sequenced according to alternative embodiments. Other substitutions, modifications, changes and/or omissions may be made in the design, operating conditions and arrangement of the preferred and other exemplary embodiments without departing from the spirit of the present invention as expressed in the appended claims.

The components of the invention may be mounted to each other in a variety of ways as known to those skilled in the art. As used in this disclosure and in the claims, the terms mount and attach include embed, glue, join, unite, connect, associate, hang, hold, affix, fasten, bind, paste, secure, bolt, screw, rivet, solder, weld, and other like terms. The term cover includes envelop, overlay, and other like terms.

It is understood that the invention is not confined to the embodiments set forth herein as illustrative, but embraces all such forms thereof that come within the scope of the following claims.

What is claimed is:

1. A light fixture comprising:
   a fixture body comprising a frame having a top side and a bottom side, the top side defining a ballast channel and the bottom side disposed adjacent to a reflector formed from a sheet material;
   a lampholder mounted to the frame and configured to receive and electrically connect to a fluorescent tube positioned adjacent to the reflector; and
   a detachable power pack that is removable from the frame substantially free from interference, the detachable power pack comprising:
   a ballast channel cover configured to detachably engage the ballast channel on the top side of frame;
   a ballast disposed within the ballast channel, wherein the ballast comprises power input wiring and ballast output wiring, and further wherein the ballast output wiring is configured to be electrically connected to the lampholder such that electrical power is provided to the lampholder; and
   a power input connector having a socket portion and a plug portion, one of the socket portion and the plug portion mounted to one of the frame and the ballast channel cover and electrically connected to the power input wiring of the ballast, and the other of the socket portion and the plug portion connectible to a power supply line to provide electrical power from a power source.

2. The light fixture of claim 1, wherein the power input connector comprises a plurality of projections on the plug portion and corresponding sockets on the socket portion.

3. The light fixture of claim 1, wherein the projections comprise a substantially square cross section.

4. The light fixture of claim 3, wherein the square cross section of the projections are hollow.

5. The light fixture of claim 4, wherein the projections further comprise at least one extension extending therefrom.

6. The light fixture of claim 5, wherein the extension extends from a midpoint on a side of the projection.

7. The light fixture of claim 5, wherein the extension extends from an end of a side of the projection.

8. The light fixture of claim 5, wherein the extension comprises a pair of extensions extending parallel to one another on opposite sides of the projection.

9. The light fixture of claim 1, wherein the ballast channel extends substantially along a center of the frame and communicates with a pair of raceways disposed substantially orthogonally proximate opposite ends of the ballast channel.

10. A method of installing lighting in a building, comprising:
    (a) supporting a preassembled light fixture from a structure, wherein the light fixture comprises:
    a fixture body comprising a frame having a top side and a bottom side, the top side defining a ballast channel;
    a lampholder coupled to the frame; and
    a power pack comprising:
    a ballast channel cover configured to detachably mount to the top side of the frame and over the ballast channel;
    a ballast disposed within the ballast channel, wherein the ballast comprises power input wiring; and
    a power input connector having a socket portion and a plug portion, one of the socket portion and the plug portion mounted within an aperture on one of the frame and the ballast channel cover and electrically connected to the power input wiring of the ballast;
    (b) connecting the other of the socket portion and the plug portion to the power source; and
    (c) coupling the socket portion to the plug portion on the top side of the frame such that the ballast receives power from the power source without removal of the ballast channel cover.

11. The method of claim 10, wherein the power input connector comprises a plurality of hollow projections having a substantially square cross-section on the plug portion and corresponding sockets on the socket portion configured to receive the projections.

12. The method of claim 11, wherein the projections further comprise at least one extension extending therefrom.

13. The method of claim 12, wherein the extension extends from a midpoint on a side of the projection.

14. The method of claim 12, wherein the extension extends from an end of a side of the projection.

15. The method of claim 12, wherein the extension comprises a pair of extensions extending parallel to one another and from opposite sides of the projection.

16. A light fixture kit comprising:
    a frame having a top side and a bottom side;
    a first raceway and a second raceway disposed proximate opposite ends of the frame;
    a first lampholder mounted to the first raceway and a second lampholder mounted to the second raceway;
    a detachable power pack comprising:
    a ballast channel cover that detachably engages the top side of the frame;
    a ballast disposed within the ballast channel, wherein the ballast comprises power input wiring, and ballast output wiring electrically connected to the lampholders; and
    one of a socket portion and a plug portion of a power input connector mounted to one of the raceways or the ballast channel cover and electrically connected to the power input wiring of the ballast; and
    the other of the socket portion and the plug portion electrically connectable to a power source for providing a live load disconnect capable of supplying power to, and removing power from, the ballast without removal of the ballast channel cover.

17. The kit of claim 16, wherein the power input connector comprises a plurality of hollow projections having a substantially square cross-section on the plug portion and mating sockets on the socket portion configured to conductively receive the projections.

18. The kit of claim 17, wherein the projections further comprise at least one extension extending therefrom.

19. The kit of claim 18, wherein the extension extends from a midpoint on a side of the projection.

20. The kit of claim 18, wherein the extension extends from an end of a side of the projection.

21. The kit of claim 18, wherein the extension comprises a pair of extensions extending parallel to one another and from opposite sides of the projection.

22. A light fixture comprising:
    a fixture body comprising a frame having a top side and a bottom side, the top side having a ballast channel and the bottom side disposed adjacent to a reflector formed from a sheet material;
    lampholders coupled to the frame and configured to receive and electrically connect to at least one fluorescent tube positioned adjacent to the reflector;
    a ballast channel cover detachably engagable with the ballast channel;
    a ballast disposed in the ballast channel, wherein the ballast comprises power input wiring and ballast output wiring, and further wherein the ballast output wiring is configured to be electrically connected to the lampholders such that electrical power is provided to the lampholders;
    a power input connector having a socket portion and a plug portion, one of the socket portion and the plug portion mounted to one of the frame and the ballast channel cover, and electrically connected to the power input wiring of the ballast, and the other of the socket portion and the plug portion connectible to a power supply line to provide electrical power from a power source;
    wherein the power input connector comprises a plurality of hollow projections having a substantially square cross-section with at least one extension extending therefrom on the plug portion, and corresponding sockets on the socket portion configured to receive the hollow projections having the substantially square cross-section with at least one extension.

23. The light fixture of claim 22, wherein the extension extends from an end of a side of the projection.

24. The light fixture of claim 22, wherein the extension comprises a pair of extensions extending parallel to one another on opposite sides of the projection.

25. The light fixture of claim 22, wherein the ballast channel extends substantially along a center of the frame and communicates with a pair of raceways disposed substantially orthogonally proximate opposite ends of the ballast channel.

26. The light fixture of claim 22, wherein the plug portion further comprises one or more locking projections configured to be received in corresponding receptacles within the socket portion.

* * * * *